(12) United States Patent
DaCosta et al.

(10) Patent No.: US 10,785,316 B2
(45) Date of Patent: Sep. 22, 2020

(54) EVOLUTIONARY WIRELESS NETWORKS

(71) Applicant: MeshDynamics, Santa Clara, CA (US)

(72) Inventors: Francis DaCosta, Santa Clara, CA (US); Vivek Gupta, Bangalore (IN)

(*) Notice: Subject to any disclaimer, the term of this patent is extended or adjusted under 35 U.S.C. 154(b) by 0 days.

(21) Appl. No.: 15/908,108

(22) Filed: Feb. 28, 2018

(65) Prior Publication Data
US 2018/0191836 A1  Jul. 5, 2018

Related U.S. Application Data

(63) Continuation-in-part of application No. 15/728,863, filed on Oct. 10, 2017, which is a continuation of application No. 14/740,062, filed on Jun. 15, 2015, now Pat. No. 9,819,747, which is a continuation-in-part of application No. 14/523,778, filed on Oct. 24, 2014, now Pat. No. 9,730,100, and a continuation-in-part of application No. 13/764,008, filed on Feb. 11, 2013, now Pat. No. 9,363,651, which is a continuation-in-part of application No. 13/627,883, filed on Sep. 26, 2012, now Pat. No. 8,923,186, said application No. 14/740,062 is a continuation-in-part of application No. 13/571,294, filed on Aug. 9, 2012, now Pat. No. 9,172,738, and a continuation-in-part of application No. 13/541,446, filed on Jul. 3, 2012, now abandoned, said application No. 13/571,294 is a continuation-in-part of application No. 12/696,947, filed on Jan. 29, 2010, now Pat. No. 8,520,691, said application No.
(Continued)

(51) Int. Cl.
*H04L 29/08* (2006.01)
*H04W 4/14* (2009.01)
*H04L 12/46* (2006.01)
*H04L 12/753* (2013.01)
*H04W 40/24* (2009.01)
*H04L 12/751* (2013.01)
*H04W 80/12* (2009.01)
*H04W 84/18* (2009.01)

(52) U.S. Cl.
CPC ........ *H04L 67/145* (2013.01); *H04L 12/4625* (2013.01); *H04L 45/02* (2013.01); *H04L 45/48* (2013.01); *H04L 67/10* (2013.01); *H04W 4/14* (2013.01); *H04W 40/248* (2013.01); *H04W 80/12* (2013.01); *H04W 84/18* (2013.01)

(58) Field of Classification Search
CPC .................................................. H04L 67/145
See application file for complete search history.

(56) References Cited

U.S. PATENT DOCUMENTS

| 5,546,391 | A | | 8/1996 | Mahany | |
|---|---|---|---|---|---|
| 5,596,723 | A | * | 1/1997 | Romohr | H04L 29/06 709/222 |

(Continued)

*Primary Examiner* — John D Blanton
(74) *Attorney, Agent, or Firm* — Cherskov Flaynik & Gurda, LLC

(57) ABSTRACT

A multilayer architecture for supporting variable networks is discussed. The architecture includes an application layer in communication with a simulation and network management layer and a coupling layer. The coupling layer interfaces with physical connections within a network device and the remaining layers; and wherein the simulation and network management layer sets one or more network parameters within the application layer.

7 Claims, 27 Drawing Sheets

Related U.S. Application Data

14/523,778 is a continuation of application No. 12/625,365, filed on Nov. 24, 2009, now Pat. No. 8,514,852, said application No. 13/571,294 is a continuation-in-part of application No. 12/352,457, filed on Jan. 12, 2009, now Pat. No. 8,477,762.

(60) Provisional application No. 62/465,526, filed on Mar. 1, 2017, provisional application No. 62/012,196, filed on Jun. 13, 2014, provisional application No. 61/621,926, filed on Apr. 9, 2012, provisional application No. 61/615,802, filed on Mar. 26, 2012, provisional application No. 61/555,400, filed on Nov. 3, 2011, provisional application No. 61/148,803, filed on Jan. 30, 2009, provisional application No. 61/117,502, filed on Nov. 24, 2008.

(56) References Cited

U.S. PATENT DOCUMENTS

| | | | |
|---|---|---|---|
| 5,818,830 | A | 10/1998 | Daane |
| 5,867,785 | A | 2/1999 | Averbuch |
| 5,935,268 | A | 8/1999 | Weaver |
| 6,046,992 | A | 4/2000 | Meier et al. |
| 6,363,062 | B1 | 3/2002 | Aaronson |
| 6,393,261 | B1 | 5/2002 | Lewis |
| 6,799,045 | B1 | 9/2004 | Brouwer |
| 6,909,705 | B1 | 6/2005 | Lee et al. |
| 6,912,204 | B2 | 6/2005 | Kossi |
| 6,912,373 | B2 | 6/2005 | Lee |
| 6,982,960 | B2 | 1/2006 | Lee |
| 7,058,050 | B2 | 6/2006 | Johansson et al. |
| 7,085,292 | B1 | 8/2006 | Grayson |
| 7,103,371 | B1 | 9/2006 | Liu |
| 7,164,667 | B2 | 1/2007 | Rayment et al. |
| 7,190,960 | B2 | 3/2007 | Tuomela et al. |
| 7,200,130 | B2 | 4/2007 | Forstadius et al. |
| 7,408,928 | B2 | 8/2008 | Bradd |
| 7,420,952 | B2 | 9/2008 | daCosta |
| 7,428,300 | B1 | 9/2008 | Drew |
| 7,443,842 | B2 | 10/2008 | Miyamoto |
| 7,583,648 | B2 | 9/2009 | daCosta |
| 7,649,852 | B2 | 1/2010 | Thubert |
| 7,738,402 | B2 | 6/2010 | Feldman |
| 8,060,395 | B1 | 11/2011 | Frasher |
| 8,144,637 | B2 | 3/2012 | Goldberg |
| 8,589,247 | B2 | 11/2013 | Mesaros |
| 8,923,186 | B1 | 12/2014 | daCosta |
| 9,256,761 | B1 * | 2/2016 | Sahu ................ G06F 16/21 |
| 9,258,765 | B1 | 2/2016 | daCosta |
| 9,363,651 | B1 | 6/2016 | daCosta |
| 2002/0055978 | A1 | 5/2002 | Jonn-Bo et al. |
| 2002/0062388 | A1 | 5/2002 | Ogier |
| 2002/0082035 | A1 | 6/2002 | Aihara |
| 2002/0085719 | A1 | 7/2002 | Crosbie |
| 2002/0137459 | A1 | 9/2002 | Ebata |
| 2002/0159409 | A1 | 10/2002 | Wolfe et al. |
| 2002/0176390 | A1 | 11/2002 | Sparr |
| 2002/0191573 | A1 | 12/2002 | Whitehill |
| 2003/0012168 | A1 | 1/2003 | Elson |
| 2003/0012193 | A1 | 1/2003 | Novaes |
| 2003/0115282 | A1 | 6/2003 | Rose |
| 2003/0147424 | A1 | 8/2003 | Famolari |
| 2003/0200185 | A1 | 10/2003 | Huerta |
| 2004/0058678 | A1 | 3/2004 | deTorbal |
| 2004/0095900 | A1 | 5/2004 | Siegel |
| 2004/0100929 | A1 | 5/2004 | Garcia-Luna-Aceves |
| 2004/0137877 | A1 | 6/2004 | Crowhurst |
| 2004/0203787 | A1 | 10/2004 | Naghian |
| 2005/0153725 | A1 | 7/2005 | Naghian |
| 2005/0237992 | A1 | 10/2005 | Mishra |
| 2005/0286464 | A1 | 12/2005 | Saadawi |
| 2006/0069702 | A1 * | 3/2006 | Moeller ................ G06F 9/542 |
| 2006/0193325 | A1 | 8/2006 | Takagi |
| 2006/0200374 | A1 | 9/2006 | Nelken |
| 2007/0136118 | A1 | 6/2007 | Gerlach |
| 2007/0144618 | A1 | 6/2007 | Adar |
| 2007/0174875 | A1 | 7/2007 | Medford et al. |
| 2007/0183346 | A1 | 8/2007 | Thubert |
| 2007/0204021 | A1 | 8/2007 | Ekl |
| 2007/0282651 | A1 | 12/2007 | Naik |
| 2008/0063001 | A1 | 3/2008 | Tanimoto |
| 2008/0214175 | A1 | 9/2008 | Papadoglou |
| 2008/0320148 | A1 | 12/2008 | Capuozzo |
| 2009/0007156 | A1 * | 1/2009 | Baek ................ H04L 12/2803 719/328 |
| 2009/0092043 | A1 * | 4/2009 | Lapuh ................ H04L 49/552 370/228 |
| 2009/0304381 | A1 | 12/2009 | Muppidi |
| 2009/0311658 | A1 | 12/2009 | Polivka |
| 2010/0005166 | A1 * | 1/2010 | Chung ................ H04L 12/2803 709/224 |
| 2010/0036690 | A1 | 2/2010 | Chafle |
| 2010/0064007 | A1 * | 3/2010 | Randall ................ G06Q 30/02 709/204 |
| 2010/0115107 | A1 | 5/2010 | Mitsuhashi |
| 2010/0150170 | A1 | 6/2010 | Lee |
| 2010/0223581 | A1 | 9/2010 | Manolescu |
| 2011/0208822 | A1 | 8/2011 | Rathod |
| 2011/0225293 | A1 | 9/2011 | Rathod |
| 2011/0231321 | A1 | 9/2011 | Milne |
| 2011/0276396 | A1 | 11/2011 | Rathod |
| 2011/0276628 | A1 | 11/2011 | Pell |
| 2012/0023545 | A1 * | 1/2012 | Qu ................ H04L 45/04 726/1 |
| 2012/0163520 | A1 * | 6/2012 | Liu ................ G01S 5/0018 375/356 |
| 2012/0202514 | A1 | 8/2012 | Kadirkamathan |
| 2013/0238404 | A1 * | 9/2013 | Elias ................ G06Q 10/06398 705/7.42 |
| 2013/0343430 | A1 | 12/2013 | Bettendorff |
| 2014/0105035 | A1 * | 4/2014 | Lam ................ H04W 28/22 370/252 |
| 2015/0036649 | A1 | 2/2015 | Chen |
| 2017/0046127 | A1 * | 2/2017 | Fletcher ................ G06F 7/10 |
| 2017/0310605 | A1 * | 10/2017 | Garcia ................ H04L 47/822 |
| 2018/0110040 | A1 * | 4/2018 | Chamarti ................ H04W 4/60 |

\* cited by examiner

REGIONAL STREAMS

- REGIONAL STREAMS TRAVERSE ONLY THE SPECIFIED DIRECTIONS AND/OR REGION
- REGIONS CAN BE GPS BOUNDARIES, OR NUMBER OF HOPS / SUBTREES
- DIRECTIONS CAN BE a) UP OR DOWN OR b) TURN-BY-TURN etc.
- RELEVANT FOR DATA IMPORTANT LOCALLY ONLY (e.g. Sibling Devices)
- DOES NOT AFFECT BACKHAUL BANDWIDTH OUTSIDE SPECIFIED REGION

EVOLUTIONARY WIRELESS NETWORKS

CROSS REFERENCES

This application claims priority as a non-provisional of U.S. Provisional Application 62/465,526 filed on Mar. 1, 2017, the contents of which are incorporated by reference.

The instant application claims is a continuation in part of U.S. application Ser. No. 15/728,863, filed on Oct. 10, 2017, presently pending, which in turn claimed as a continuation of U.S. application Ser. No. 14/740,062, filed on Jun. 15, 2015, patented as U.S. Pat. No. 9,819,747 on Nov. 14, 2017, which in turn claimed priority as a non-provisional of U.S. Provisional Application Ser. No. 62/012,196, filed on Jun. 13, 2015, the contents of each are hereby incorporated by reference.

U.S. application Ser. No. 15/728,863 is also continuation in part of U.S. Utility application Ser. No. 13/764,008, filed on Feb. 11, 2013, which is issued as U.S. Pat. No. 9,363,651 on Jun. 7, 2016, which in turn claimed priority as a continuation in part of U.S. Utility application Ser. No. 13/627,883, filed on Sep. 26, 2012, and issued as U.S. Pat. No. 8,923,186 on Dec. 30, 2014, which in turn claimed priority as a non-provisional utility application of Provisional U.S. Patent Application Ser. No. 61/555,400 filed on Nov. 3, 2011, and Provisional U.S. Patent Application Ser. No. 61/615,802, filed on Mar. 26, 2012, and Provisional U.S. Patent Application Ser. No. 61/621,926, filed on Apr. 9, 2012, the contents of which are hereby incorporated by reference.

U.S. application Ser. No. 15/728,863 is also continuation in part of U.S. patent application Ser. No. 13/571,294, filed on Aug. 9, 2012, issued as U.S. Pat. No. 9,172,738 on Oct. 27, 2015, which in turn claimed priority to U.S. patent application Ser. No. 12/696,947, filed on Jan. 29, 2010, issued as U.S. Pat. No. 8,520,691 which issued on Aug. 27, 2013, which in turn claimed priority as a non-provisional of U.S. application Ser. No. 61/148,803, filed on Jan. 30, 2009, the contents of each prior application is hereby incorporated by reference. Application Ser. No. 13/571,294 also claimed priority as a continuation in part of U.S. Utility application Ser. No. 12/352,457, filed on Jan. 12, 2009, and issued as U.S. Pat. No. 8,477,762 on Jun. 2, 2013, the contents of each prior application is hereby incorporated by reference.

U.S. application Ser. No. 15/728,863 is also continuation in part of U.S. application Ser. No. 13/541,446 filed on Jul. 3, 2012, presently abandoned, the contents of which are hereby incorporated by reference.

U.S. application Ser. No. 15/728,863 is also continuation in part of U.S. Utility application Ser. No. 14/523,778, filed on Feb. 12, 2015, which issued as U.S. Pat. No. 9,730,100 on Aug. 8, 2017, which in turn claims priority to U.S. Utility application Ser. No. 12/625,365, filed on Nov. 24, 2009, issued as U.S. Pat. No. 8,514,852 on Aug. 20, 2013, which in turn claimed priority to U.S. application 61/117,502, filed on Nov. 24, 2008, which are hereby incorporated by reference.

The contents of each application is hereby incorporated by reference.

FIELD OF THE INVENTION

The field of the invention is advanced network design and implementation, capable of handling multiple types of network traffic simultaneously.

BACKGROUND OF THE INVENTION

Convergent Networks: There is increasing demand within the industrial enterprise, the smart home, car and cities to employ one wireless network to support both voice, video and data applications. The "voice" network, e.g.: the telephone system, is often separate from the "data" network. Convergence is, as the name implies, the ability to converge these two networks into one network, servicing diverse performance (throughput, jitter, latency) requirements demanded by the applications running within one wireless network.

Rapid Re-routing: The challenge lies in providing—within the same wireless network—the ability to address potentially conflicting latency and throughput needs of diverse applications. For example, voice traffic needs to be transmitted with low delay (latency). Conversely, data transmissions mandate reliable delivery of all packets and while low latency is desirable, low latency is not essential. Wireless network topologies should ideally be driven by the needs of application processes, see FIGS. 1-4. When traffic requirements cannot be accommodated, the switch over to another routing path ("topology") should be seamless and transparent to the end user applications with minimal data loss during the transitions.

Self-Tuning: Large network deployments, operating over multiple radio protocols and hardware, require a device abstracted framework that incorporates machine learning to predict and avoid network bottlenecks by changing the network properties, such as routing paths, before network bottlenecks occur. Learnt behaviors may first be validated in a simulation environment with representative test cases and then tested in the real world. Real world data is gathered and refines and evolves the simulation models—which in turn refine the rules or parameters settings for the network. These networks are disruption tolerant by design: for example, connectivity with "cloud" servers is intermittent at best. The framework must therefore support isolated networks, often mobile, that coalesce with other trusted networks to form larger "logical" networks see FIGS. 22-25.

SUMMARY OF THE INVENTION

This disclosure addresses multiple embodiments. The methods taught address a variety of networking challenges, specifically for mobile, temporal, or isolated networks, as can occur when a collection of wireless nodes is moving, such as the solutions shown in FIGS. 12-13. 22, 23-25 and discussed below. Last mile connectivity to edge devices are particularly affected. These methods teach means to manage the logical topology of large networks within an application-aware framework.

One objective of this invention is to allow the characteristics of the network to be set by a cloud server, which learns and "tunes" the characteristics of the network, such as focusing on low-latency, high throughput, guaranteed delivery times, and other network characteristics, based on the needs of applications running in the enterprise.

Another objective is to support disruption tolerance, as shown in FIG. 22, and the use of multiple wireless protocols or communication hardware within one "logical" abstracted framework that can identify traffic congestion patterns emerging and address then proactively. These learning systems may operate concurrently on sections of the multiple sections of the network, as shown in FIGS. 8 and 9.

Another objective is to define an automated process to model, simulate, deploy and self-tune large networks of networks, as discussed in FIGS. 22-25. The automated process operates within a framework taught in FIGS. 20-21, comprised of simulation, automation scripting, deployment, and adaptive topology management. The framework is intentionally radio protocol and hardware abstracted. Communication links are represented as Logical Radios, capable of bridging across diverse protocols and channel frequency bands. The logical links form a tree (directed acyclical graph) and the routing of packets across the tree is modeled as the aggregated time from source to destination.

As an analogy, consider the total time for a passenger to travel from London to Singapore. The journey includes multiple aircraft changes ("hops") with delays in deplaning, lay over and re-boarding. This is referred to as bridge latency, and occurs with predicable variability at each hop. Poor airport design can affect bridging especially if the terminals are remote and passengers need to be shuttled between remote hubs (e.g. international terminals connected to local ones). For this reason airlines actively compete for valuable high quality gates at terminals.

This application discusses methods to proactively modify the data flow within a network. In light of the analogy, packets are passengers and aircraft changes are transmissions between different network infrastructure elements, such as nodes in a wireless network or interconnected switches and routers. Just as airport layout is optimized so passenger bridging time is minimized, the connections and other properties of the network infrastructure are optimized for a particular application.

BRIEF DESCRIPTION OF DRAWINGS

In order to more fully describe embodiments of the present invention, reference is made to the accompanying drawings. These drawings are not to be considered limitations in the scope of the invention, but are merely illustrative.

DETAILED DESCRIPTION

Overview of the Figures

Figure 1:
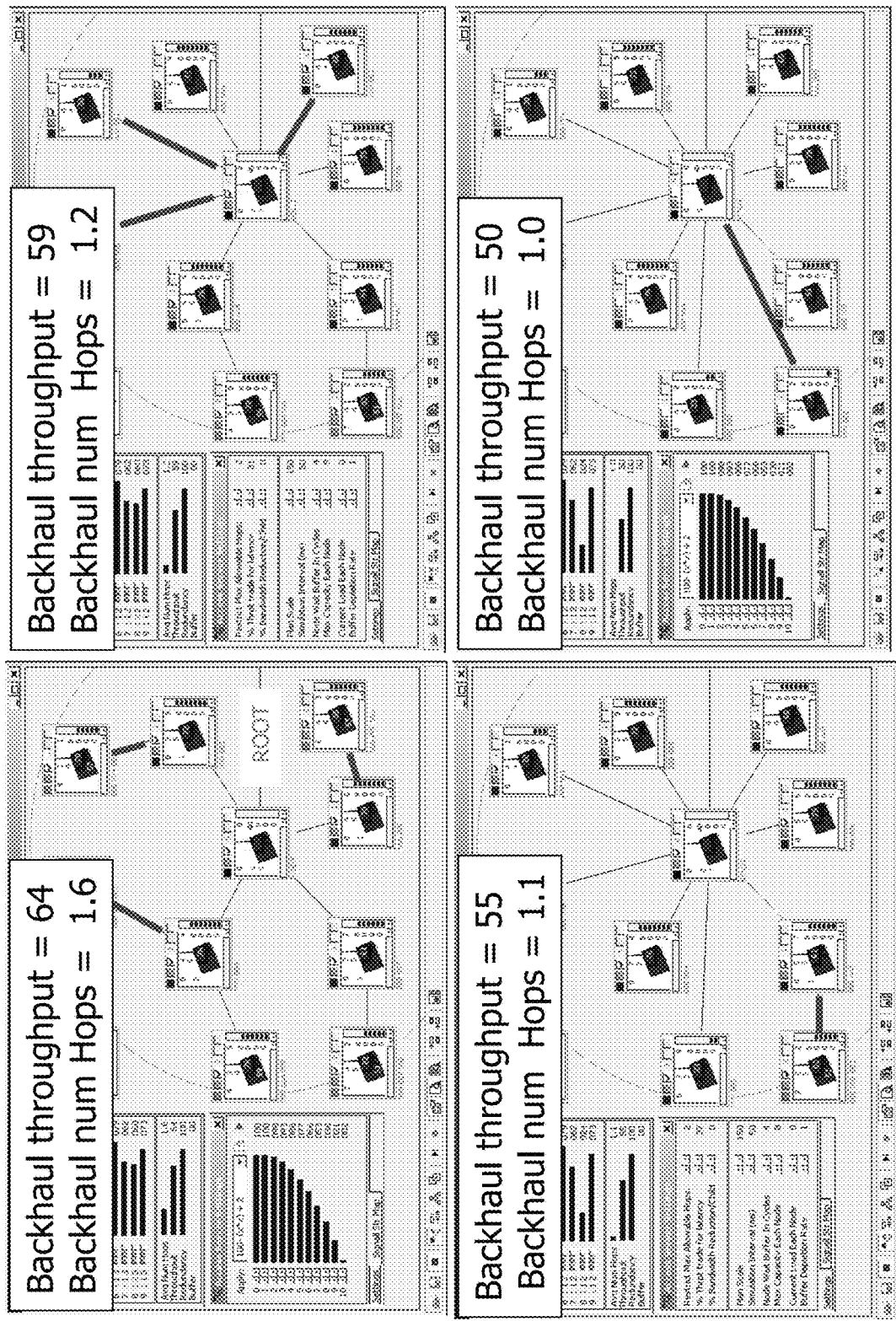
FIG. 1 depicts a network topology diagram over time, pursuant to one embodiment of the invention.

FIG. 1 illustrates how the network topology is changed by selecting a different back-haul in a two-radio system, with one link to the back-haul AP and the other link servicing the child AP. It depicts four network topologies. Each of the four network topologies provides a different set of performance in terms of latency and throughput. The mesh control software adjusts the latency and throughput parameters to meet voice/video or data performance requirements in terms of latency and bandwidth.

Figure 2:
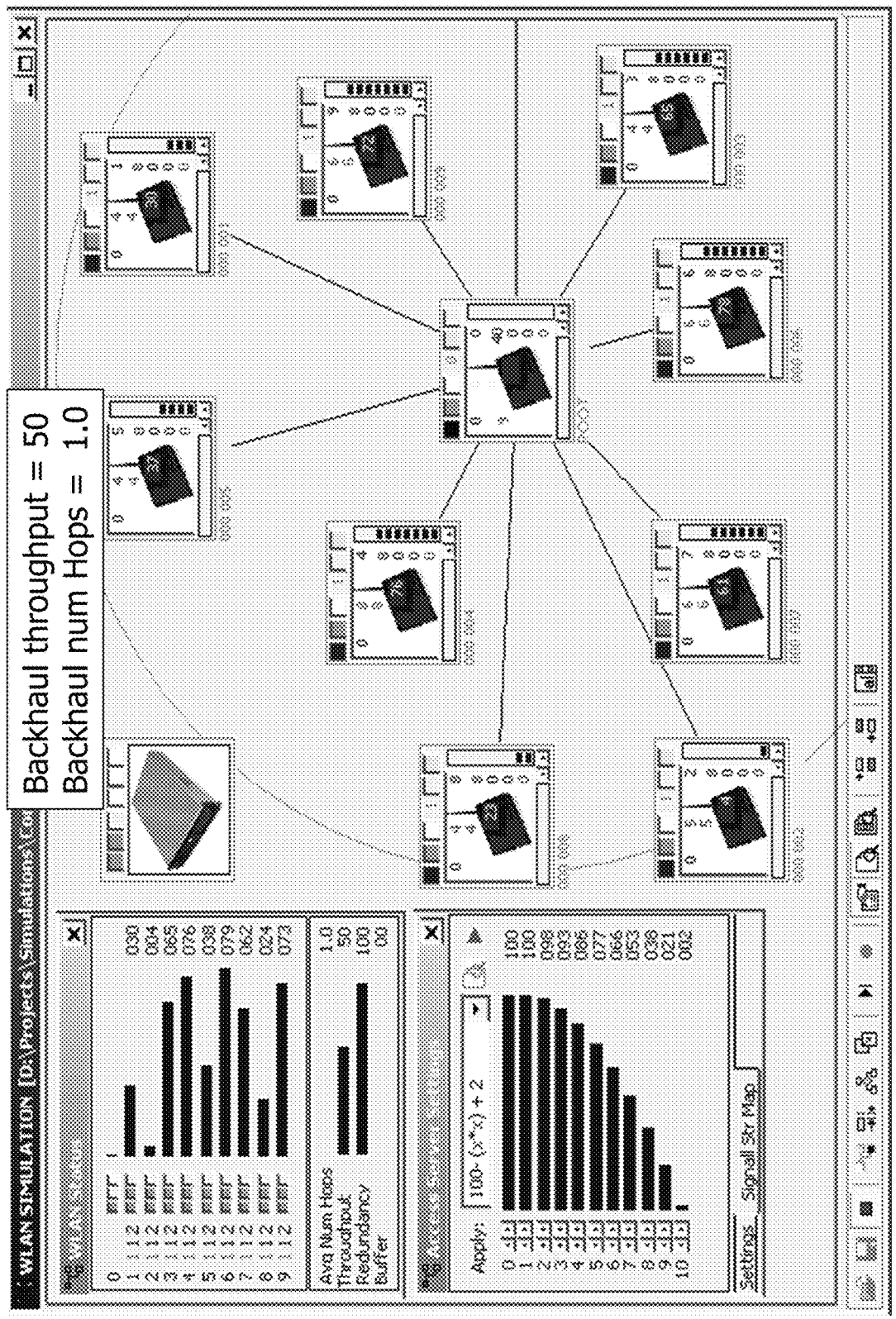
FIG. 2 depicts performance characteristics of a network in time, pursuant to one embodiment of the invention.

FIG. 2 illustrates a wireless network, first in a star configuration, with low latency but poor throughput according to an embodiment of the present invention. An inverse square law model is applied, which is user definable to emulate specific radio and antenna link qualities. The simulation environment includes a WLAN Health Monitor that ensures all nodes have a redundant path, in case of node failure.

Figure 3:
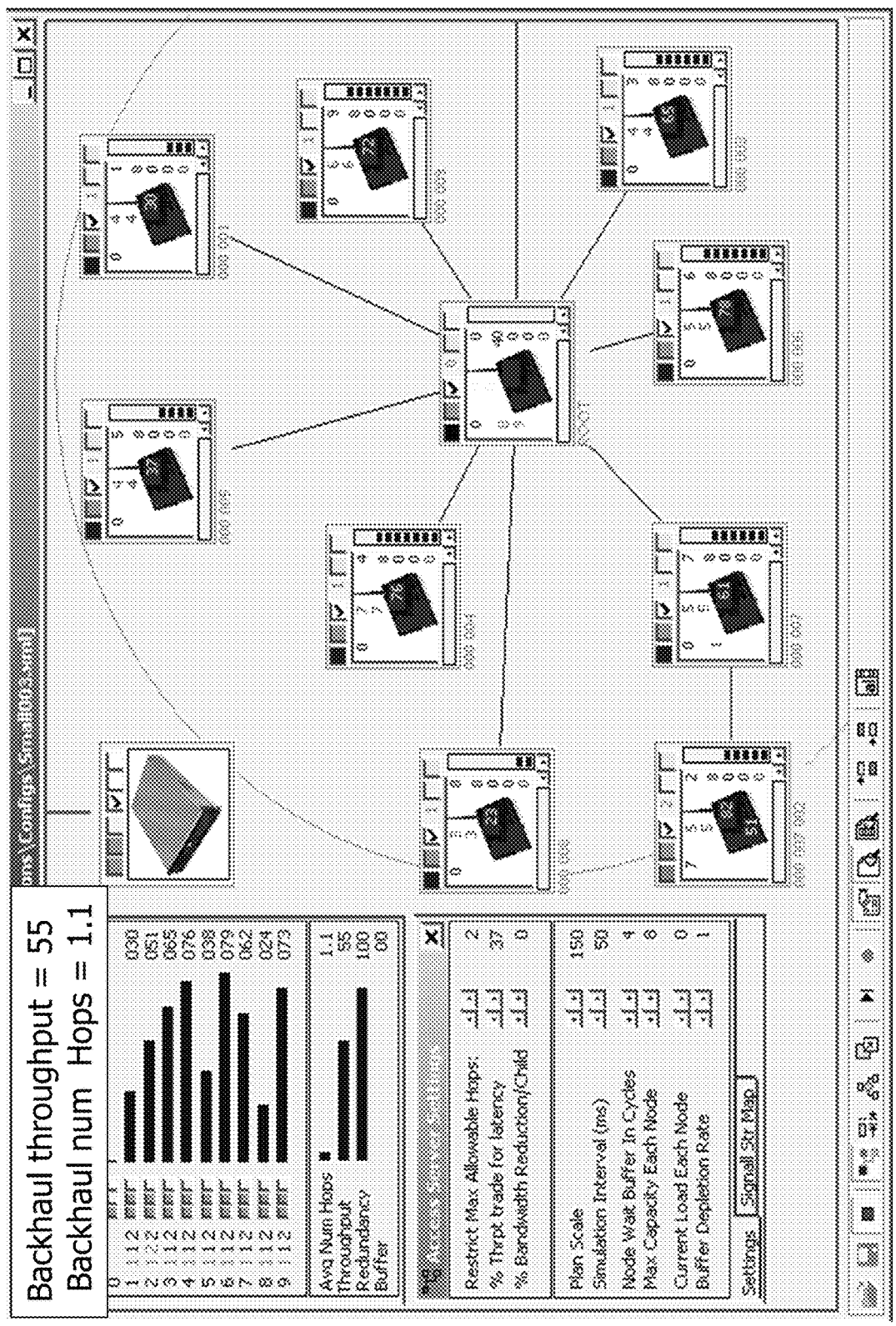
FIG. 3 depicts performance characteristics of a network in a further time period, pursuant to one embodiment of the invention.

FIG. 3 shows a network routing path change for one node, based on a change on policy administration. The parameter "Restrict Max Allowable Hops" has been changed from 1 (for a star configuration) to 2.

Figure 4:
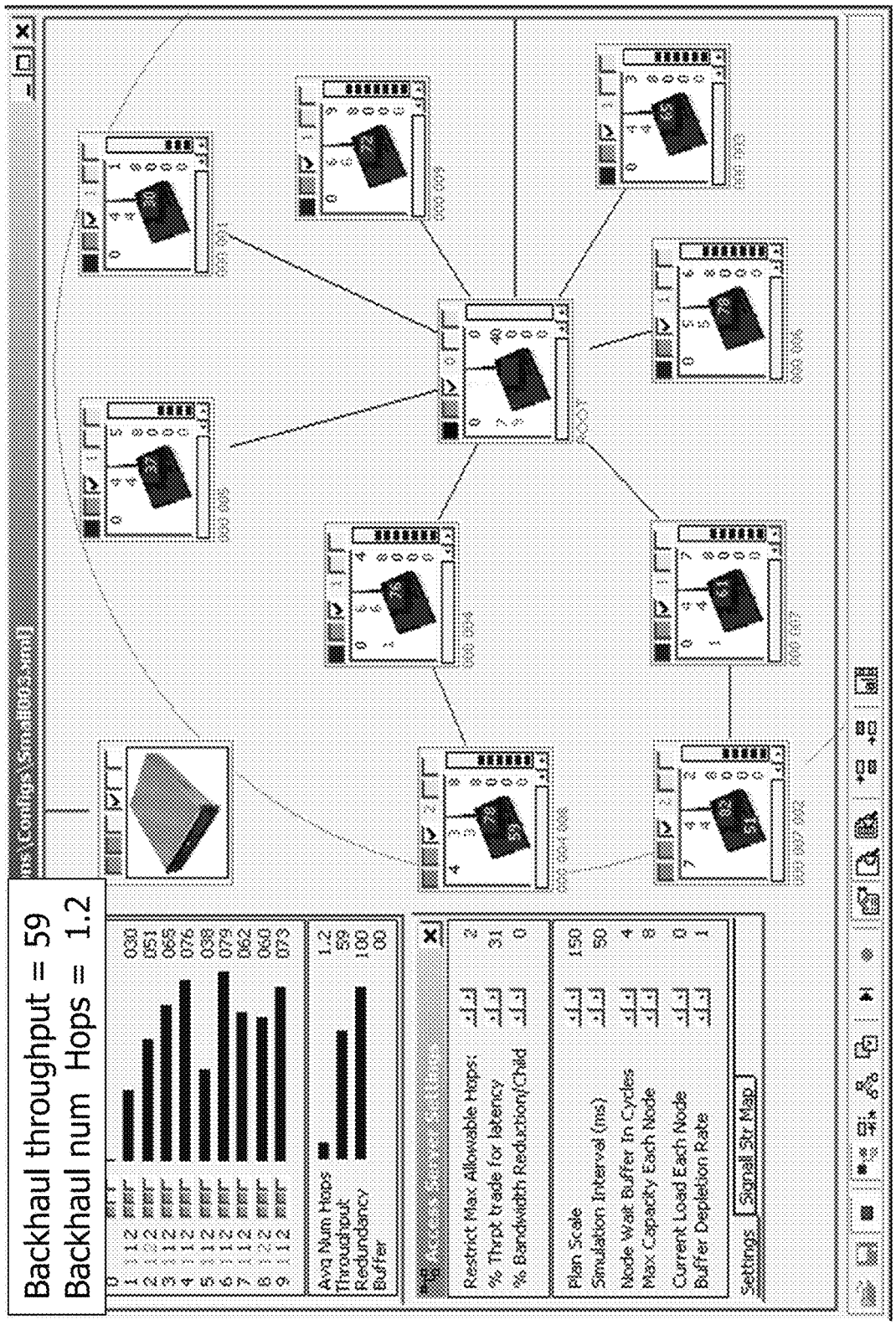
FIG. 4 depicts performance characteristics of a network in yet a different time period, pursuant to one embodiment of the invention.

FIG. 4 shows the result of how wireless network self configures to meet a latency/throughput trade-off from 37% in FIG. 3 to 31% in FIG. 4. The percentage is indicated in the field "% Thrpt trade for latency." Low latency drives lower hops or relays from the root node. Nodes far from the root node have poor connectivity when connected directly. Further they suffer from the "hidden node" problem. Intermediary nodes thus improve overall throughput of the network but at the cost of more latency (hops) for some routing paths.

Figure 5:
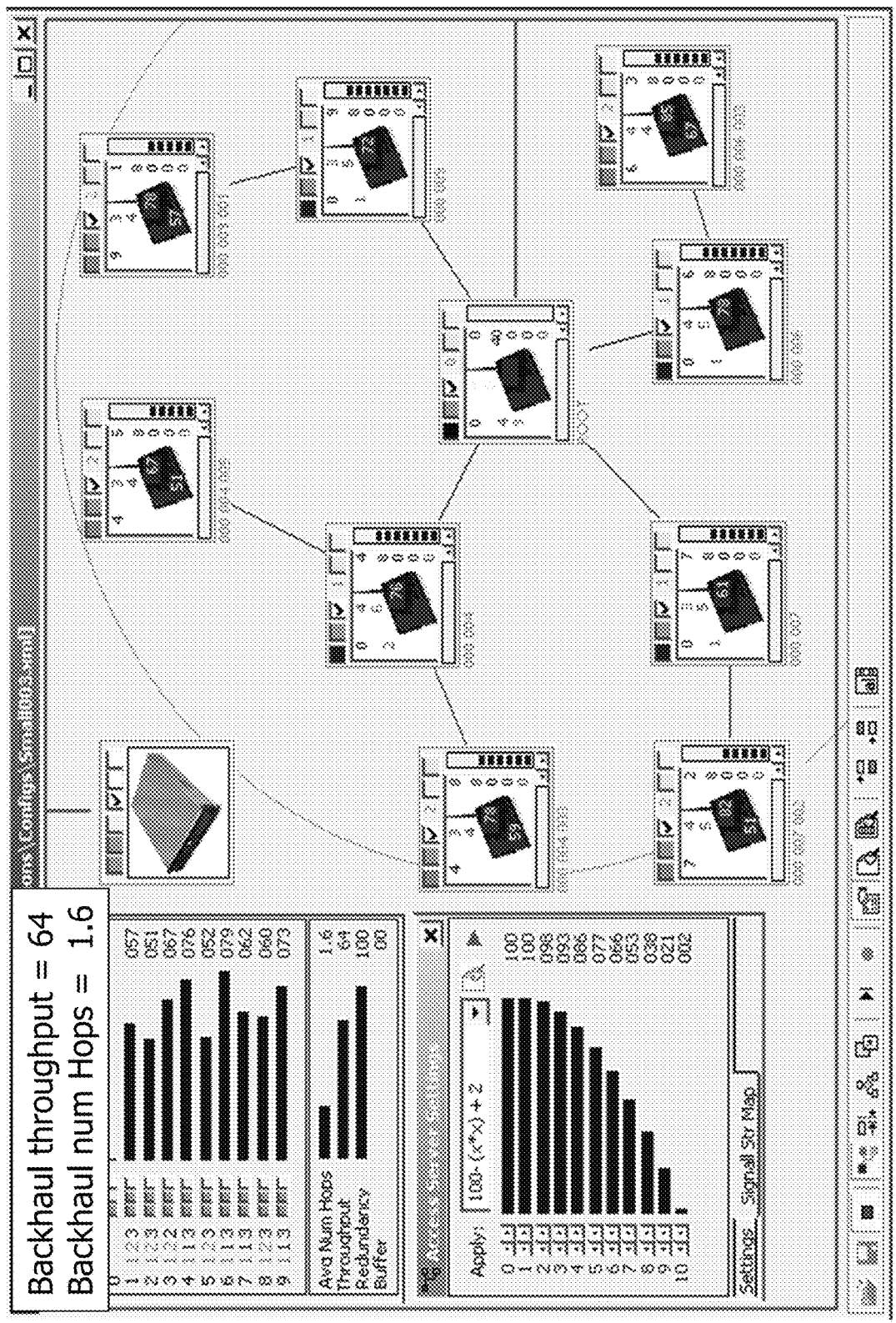
FIG. 5 depicts performance characteristics of a network in yet a different time period, pursuant to one embodiment of the invention.

FIG. 5 shows the new topology when the throughput/latency ratio is further reduced. Note that another approach to improving throughput without affecting latency may be to switch to more powerful radios for parts of the remote network. This may be simulated also via the Signal to Map Table.

Figure 6:
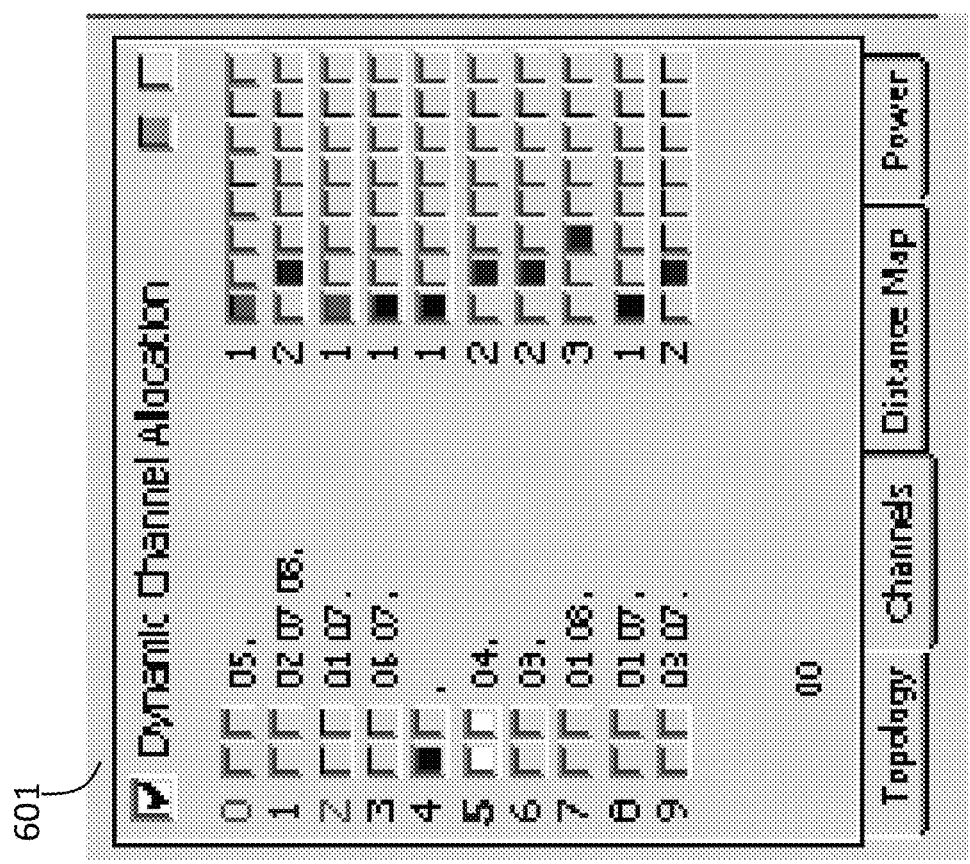
FIG. 6 depicts performance characteristics of a network elements, pursuant to one embodiment of the invention.

FIG. 6, shows the results 601 of Dynamic Channel Allocation (DCA) being automatically selected by the simulation engine, based on the DCA algorithms taught in referenced applications. The path is based on the routing path e.g. for Node 1 it is shown in table 6-02-7-06, three hops from the root node 4. Three colors are used to denote the three non overlapping channels selected by DCA.

The table 602 depicts the signal strength map degradation over distance from the transmitter. An inverse square law is depicted. Values mat be also changed manually. This information is used by the simulation to compute the RF throughput between a physical radio transmitter and physical radio receiver link. Logical radios links are covered later.

Figure 7:
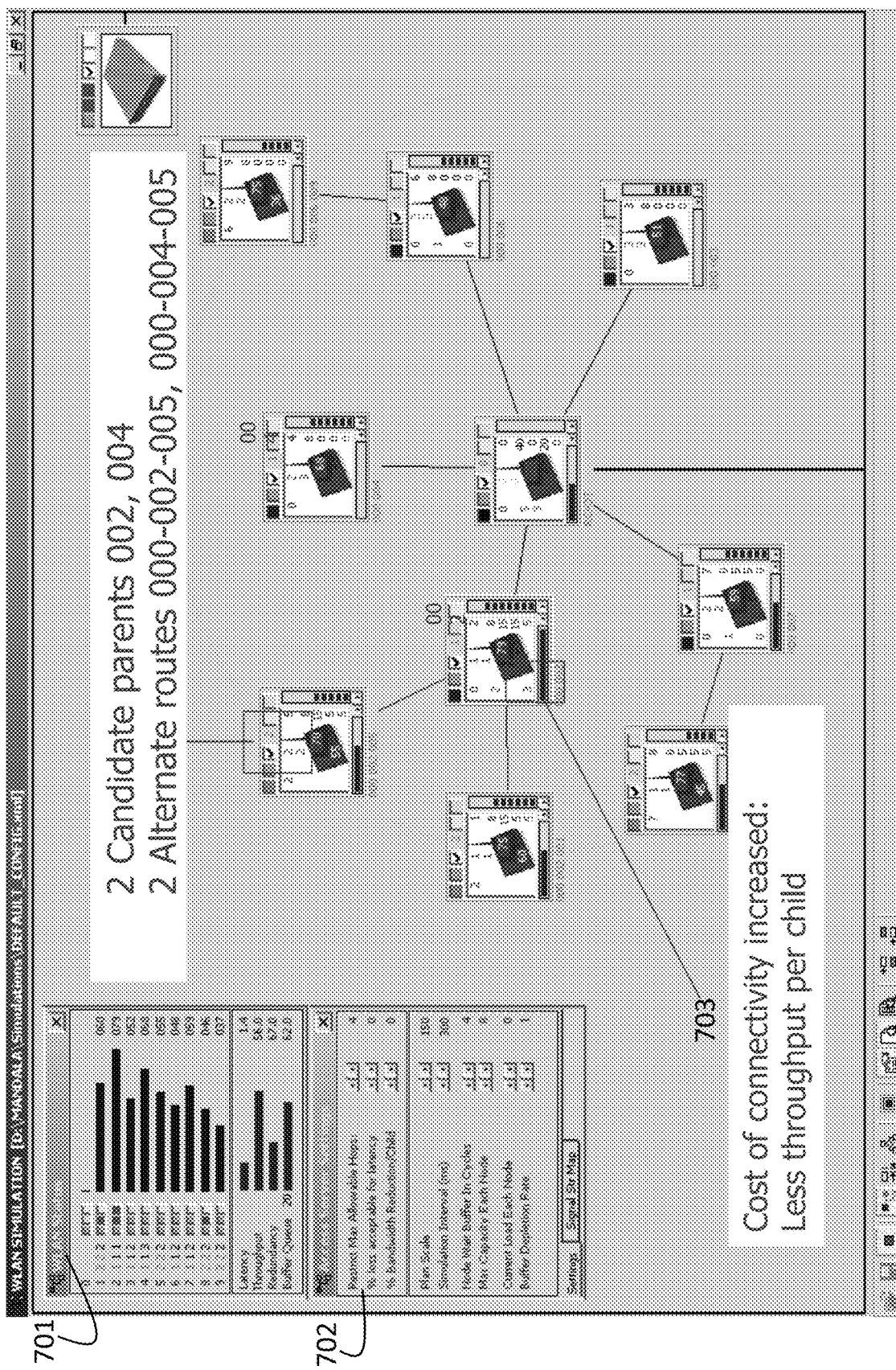
FIG. 7 depicts simulation results for a network in a time period, pursuant to one embodiment of the invention.
Figure 12:
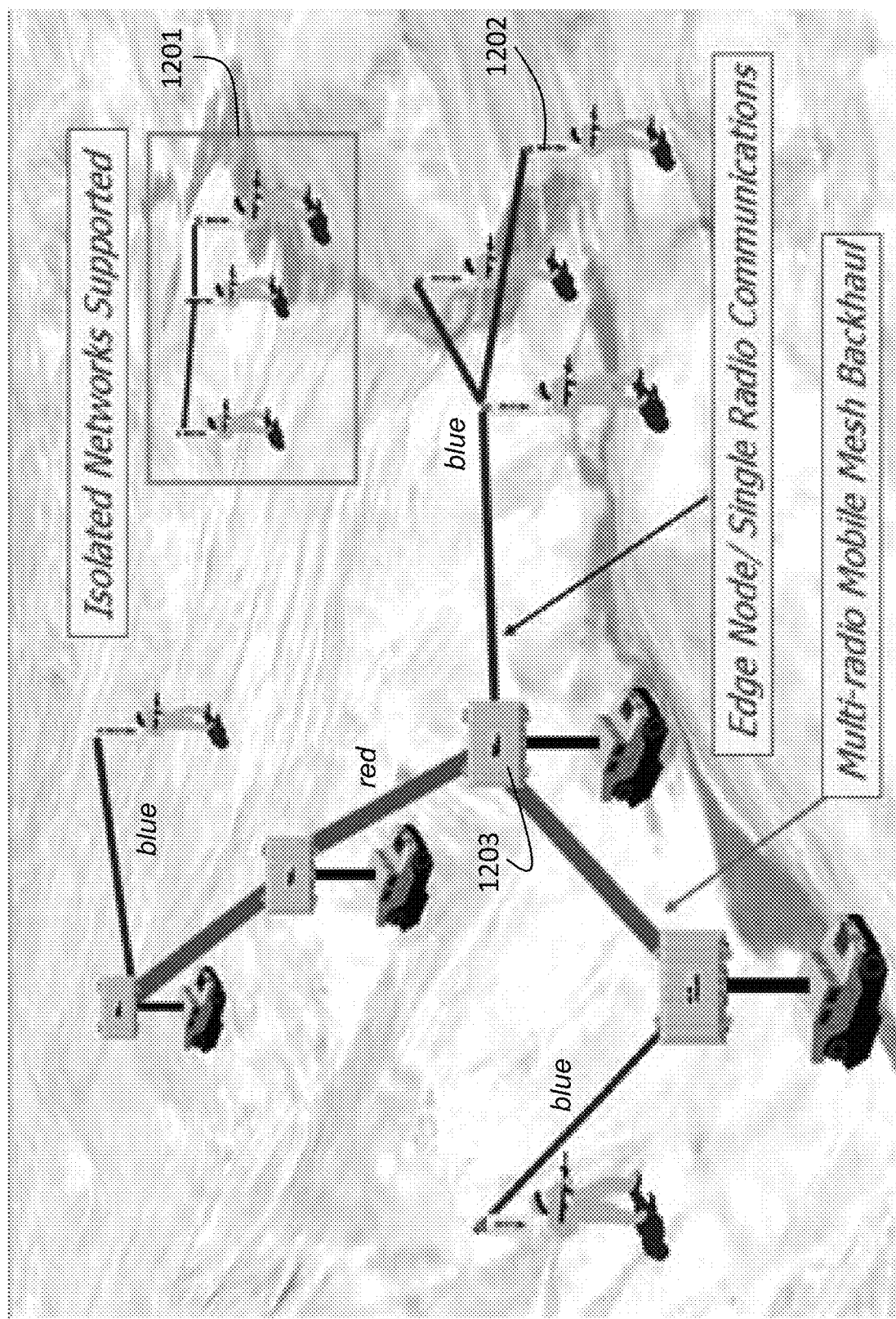
FIG. 12 depicts a view of network participants, pursuant to one embodiment of the invention.

FIG. 7 shows one embodiment of the simulation environment, part of the framework described in FIG. 12. A signal strength map has been supplied for each radio link shown in network tree depicted. For each node a "health index" is tabulated, based on the signal strength from its parent down-link, the number of alternate candidate parents available in case fail over is needed, the congestion and burst-nature of clients and applications that move traffic through the node etc. In the chart 701, some nodes are shown as unhealthy (red) and sub tree that those nodes are part of may be affected. Routing paths within the sub tree may need to be re examined or applications running on those nodes be shifted to other nodes. Rules governing network topology are shown in the setting selector 702. Of special importance in this application is the Latency-Throughput trade-off ratio. Other non dimensional ratios include RF throughput efficiency (measured against a theoretical max), jitter and latency for each segment of a routing path compared against estimates etc. Data specific to the node is shown in the node display 703. The model is periodically refined against the real world field tests.

Figure 8:
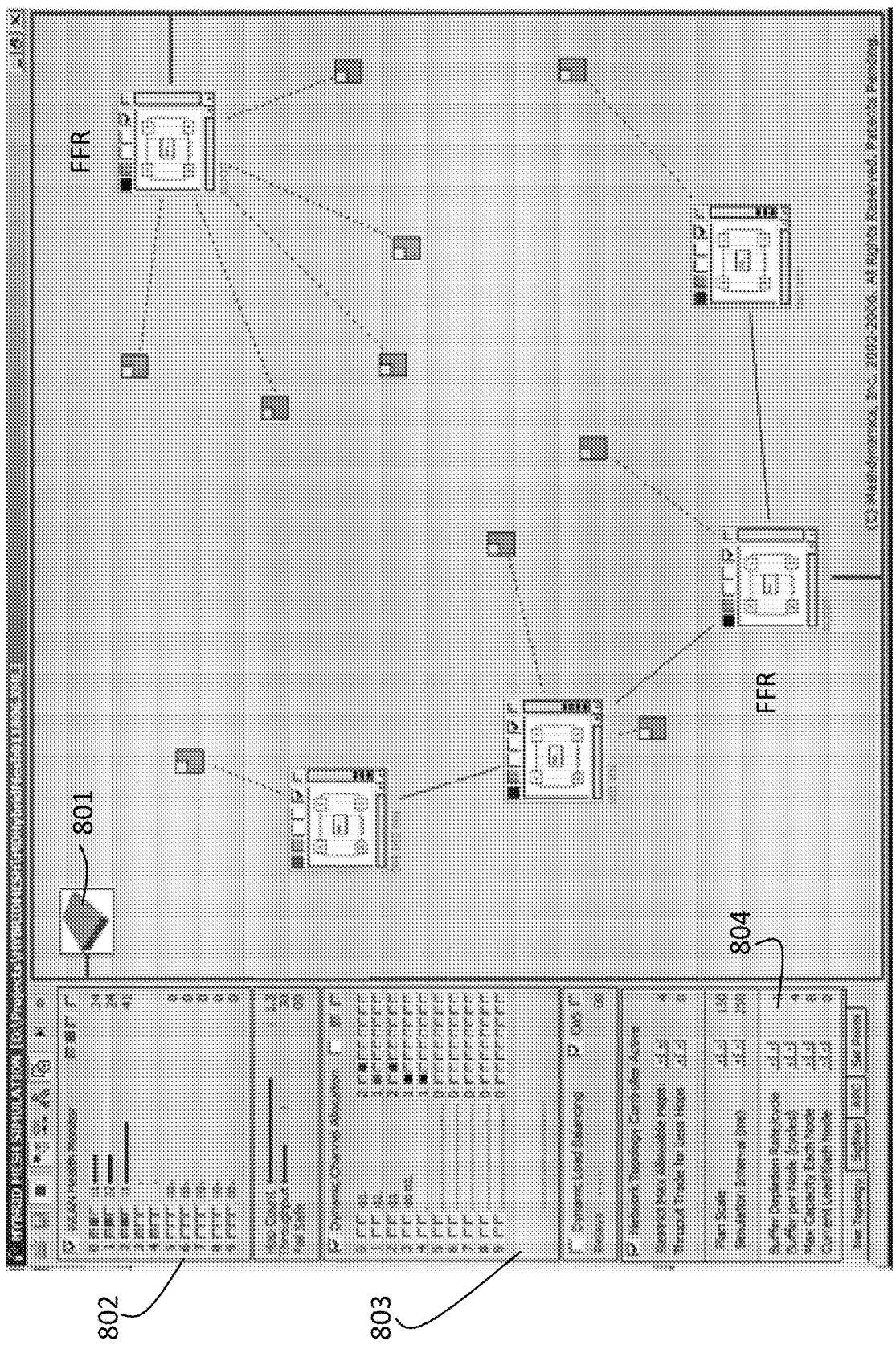
FIG. 8 depicts simulation results for a reconfigured network in a different time period, pursuant to one embodiment of the invention.
Figure 9:
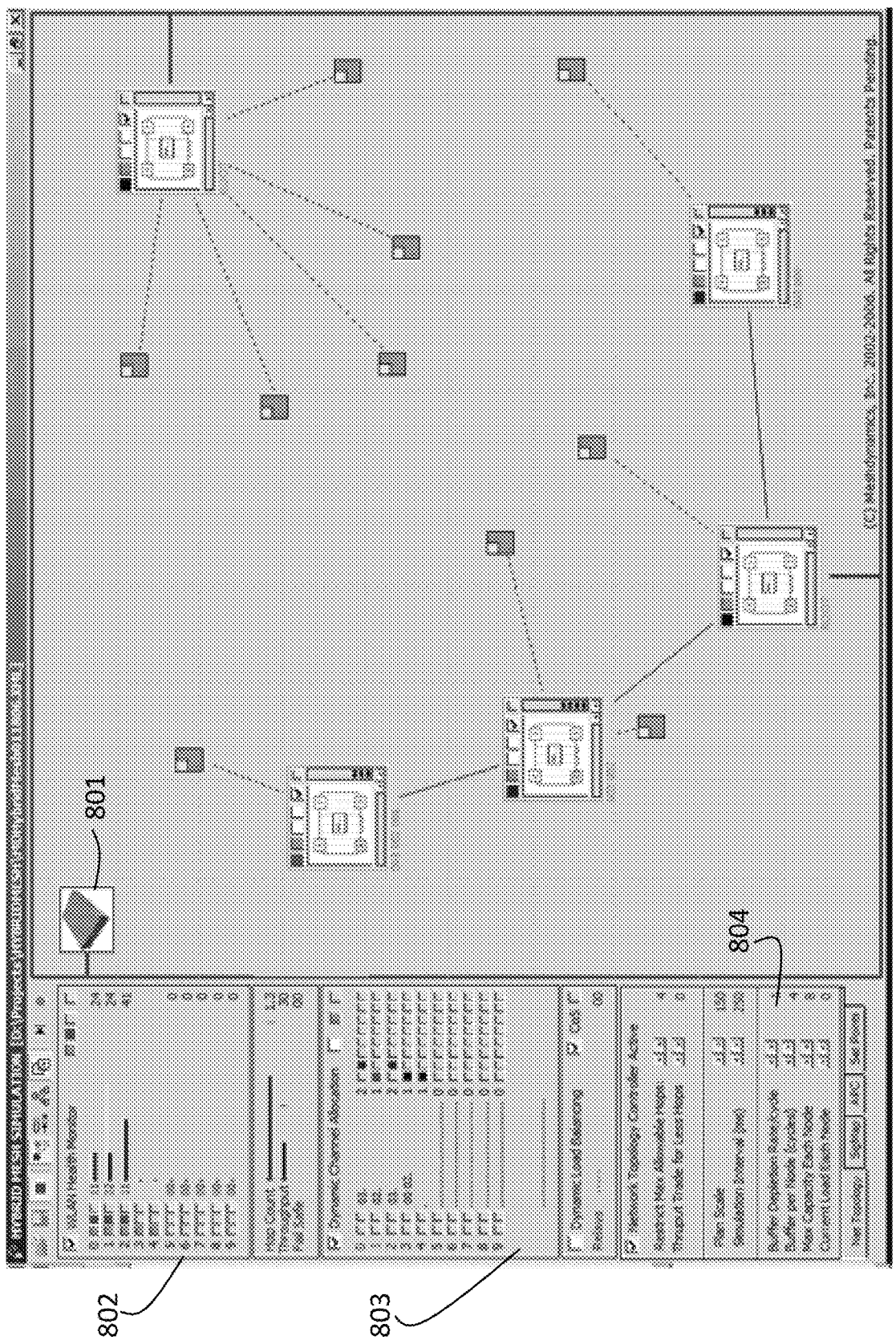
FIG. 9 depicts simulation results for a network in yet another time period, pursuant to one embodiment of the invention.

FIGS. 8 and 9 depict a fail-over when one of two root nodes ceases to function. A policy server 801 defines the rules and parameters, such as the values set in table 804. The DCA Channel Allocation is depicted in the chart 803. The node table 802 depicts the health index for nodes before the fail-over. The connections in FIG. 9 are achieved not through mesh nodes but single radio clients running the single radio version of the mesh software.

Figure 10:
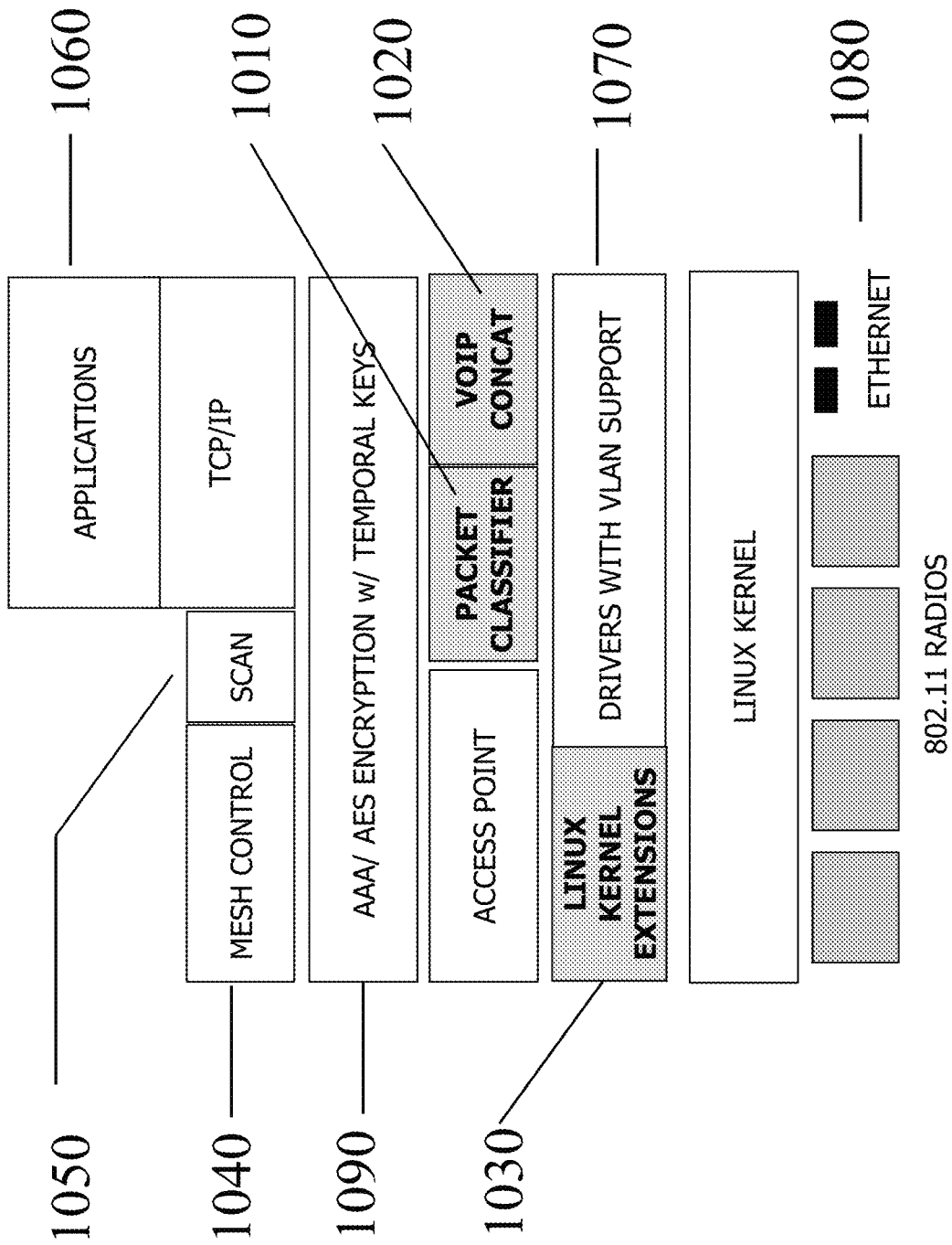
FIG. 10 depicts a schematic of network components, pursuant to one embodiment of the invention.

FIG. 10 is one embodiment of the mesh node network stack. Application driven rules and Scripts are resident in device abstracted APPLICATION layer library 1060, a supervisory control layer above three lower control layer modules: TCP/IP, MESH CONTROL 1040 and SCAN 1050. Direct Machine to Machine (M2M) communications are controlled by APPLICATION over the Software MAC layer. The Software MAC Layer is typically running at the Kernel level of the software platform, requiring LINUX KERNEL EXTENSION 1030. These extensions enable low level, fast applications/algorithms, operating at close to port forwarding tables, operating at (Kernel level) Drivers for Ports, such as ETHERNET. The APPLICATION layer is analogous to the Control Plane in the SDN paradigm. Also shown are the HARDWARE DRIVERS WITH VLAN SUPPORT 1070 as well as PACKET CLASSIFIER 1010 and VOIP CONCATENATION 1020. Security features are also provided, including encryption provided by the AAA/AES ENCRYPTION w/TEMPORAL KEYS layer 1090.

Figure 11:
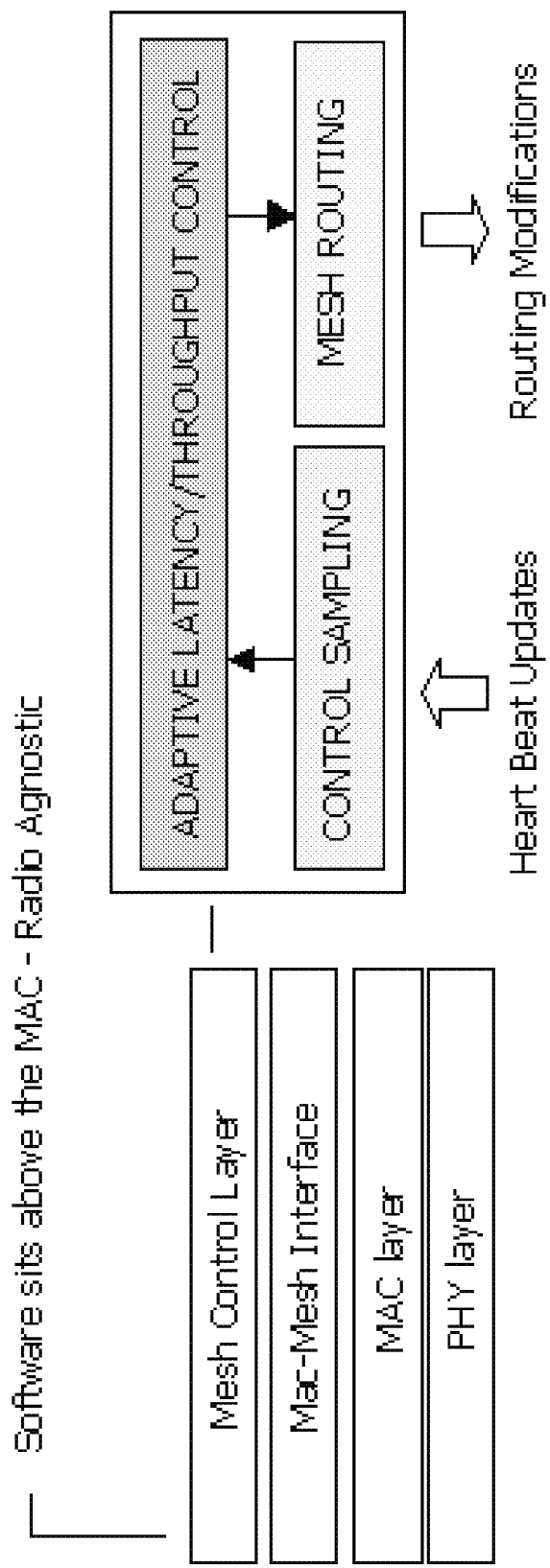
FIG. 11 depicts a logical schematic of network elements, pursuant to one embodiment of the invention.

FIG. 11 is a control loop depiction of MESH-CONTROL. Heart beats provide information on neighboring nodes and policy changes, directed by changes in the physical topology or the logical topologies of applications running on the nodes. Change in mesh routing is then executed by kernel level tasks and coordinated with other nodes in its community.

FIG. 12 depicts a mobile multi-radio back-haul 1203. Isolated networks 1202 may later merge, see 1201. Note that the red and blue depict different channel frequency bands (5.8 GHz, 2.4 GHz, 900 MHz) and protocols (Blue-tooth, Wi-Fi). DCA algorithms, Signal Strength Maps and Latency/Throughput characteristics are computed/estimated for the composite network of 1202 and 1203 in order to determine the total time of travel from source to destination.

Figure 13:
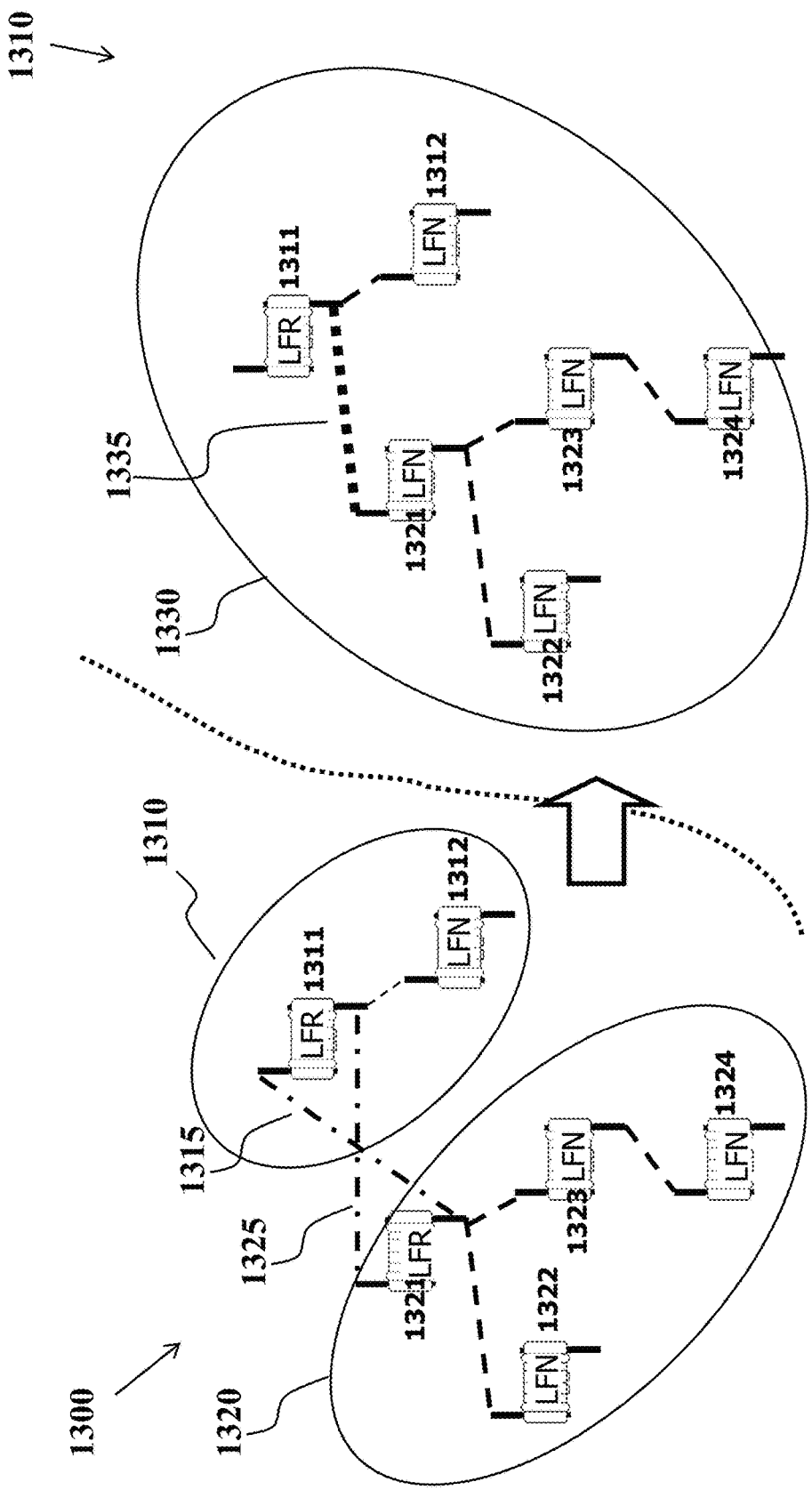
FIG. 13 depicts methods of network joining, pursuant to one embodiment of the invention.
Figure 14:
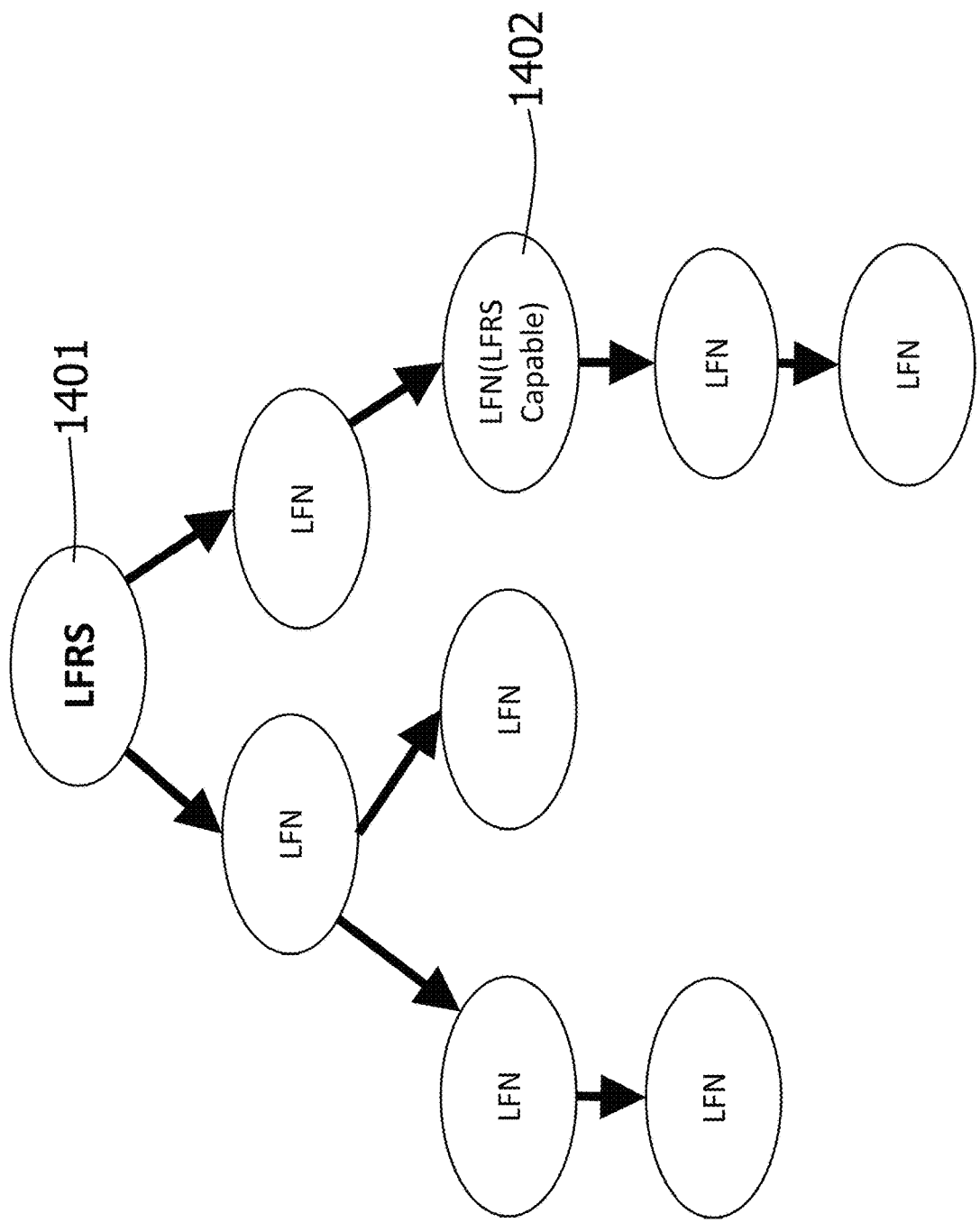
FIG. 14 depicts a logical tree layout of the network components, pursuant to one embodiment of the invention.

FIG. 13 reiterates the methods taught in U.S. Pat. No. 8,976,733 B2, "Persistent mesh for isolated mobile and temporal networking" which are extended to support a generic topology management approach for both physical links (radio to radio) and logical links (application to application). This figure sets context for FIGS. 14-19. In isolated area 1300 two isolated sub trees have found each other and are ready to coalesce to area 1310. There are two roots for each sub tree, LFR 1311 and LFR 1321. In general the "smaller" tree is attached to the larger one, however link quality metrics may dictate otherwise. As shown in 1311 LFR 1311 was chosen. The routing tables are then changed. The hierarchy preference was FFR-FFN-LFR-LFN FIGS. 14-16 apply FIG. 13 for new additions to hierarchy preferences to include a new mode LFRS. In FIG. 14, the root node 1401 is shown as a LFRS root node, which is a node capable of satellite communications (LFR-Satellite) and therefore shown active in a mobile isolated tree comprising of another inactive Satellite capable LFRS mesh node, 1402, currently dormant and operating in LFN mode.

Figure 15:
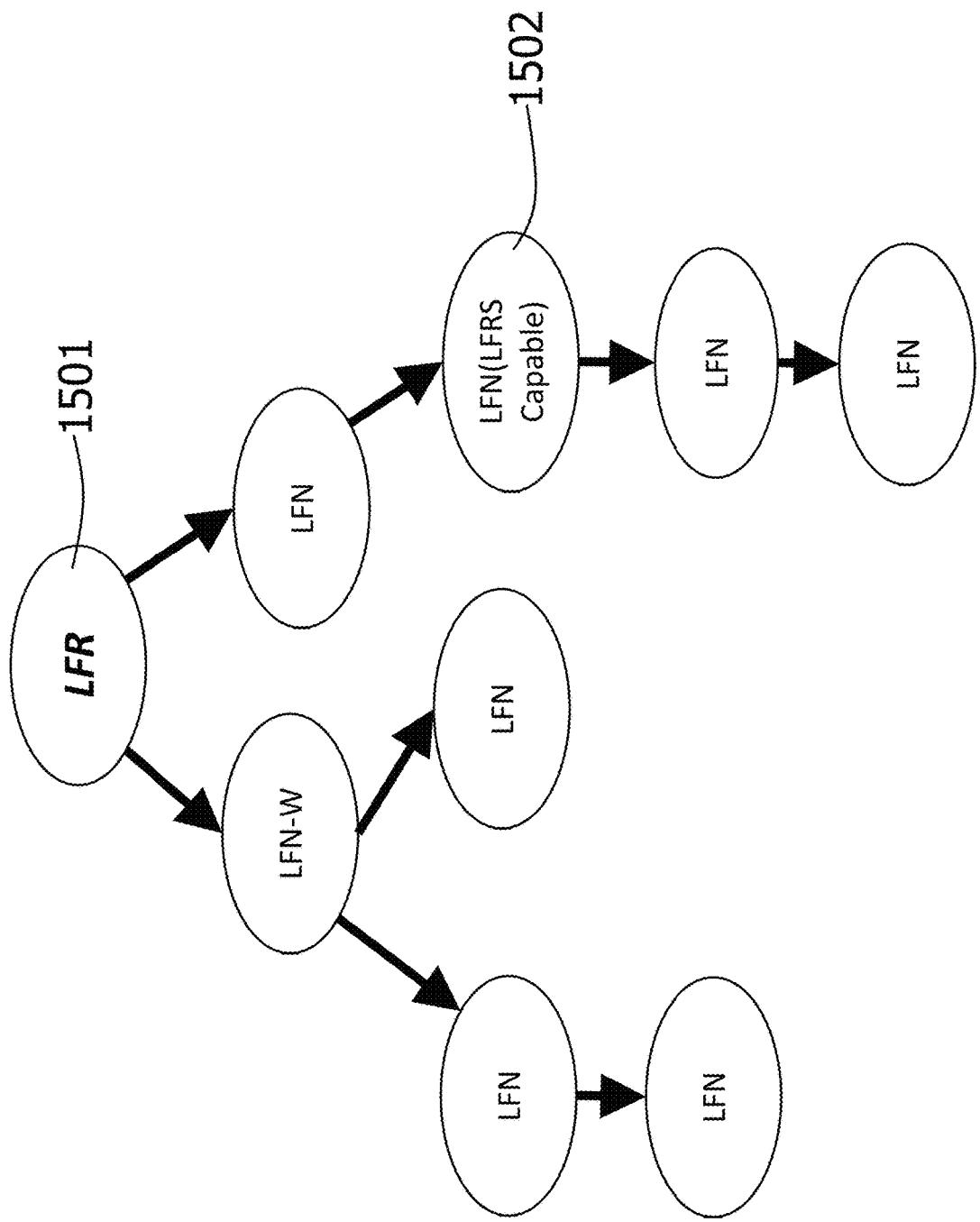
FIG. 15 depicts another logical tree layout of the network components, pursuant to one embodiment of the invention.

In FIG. 15 the root node 1501 and the LFRS root node loses its connectivity. This demotes it to LFR status thereby preserving the network topology and routing links. No routing paths are changed. A notification is sent to wake up LFRS capable node 1502. When the satellite connection is active, the topology controller is informed.

Figure 16:
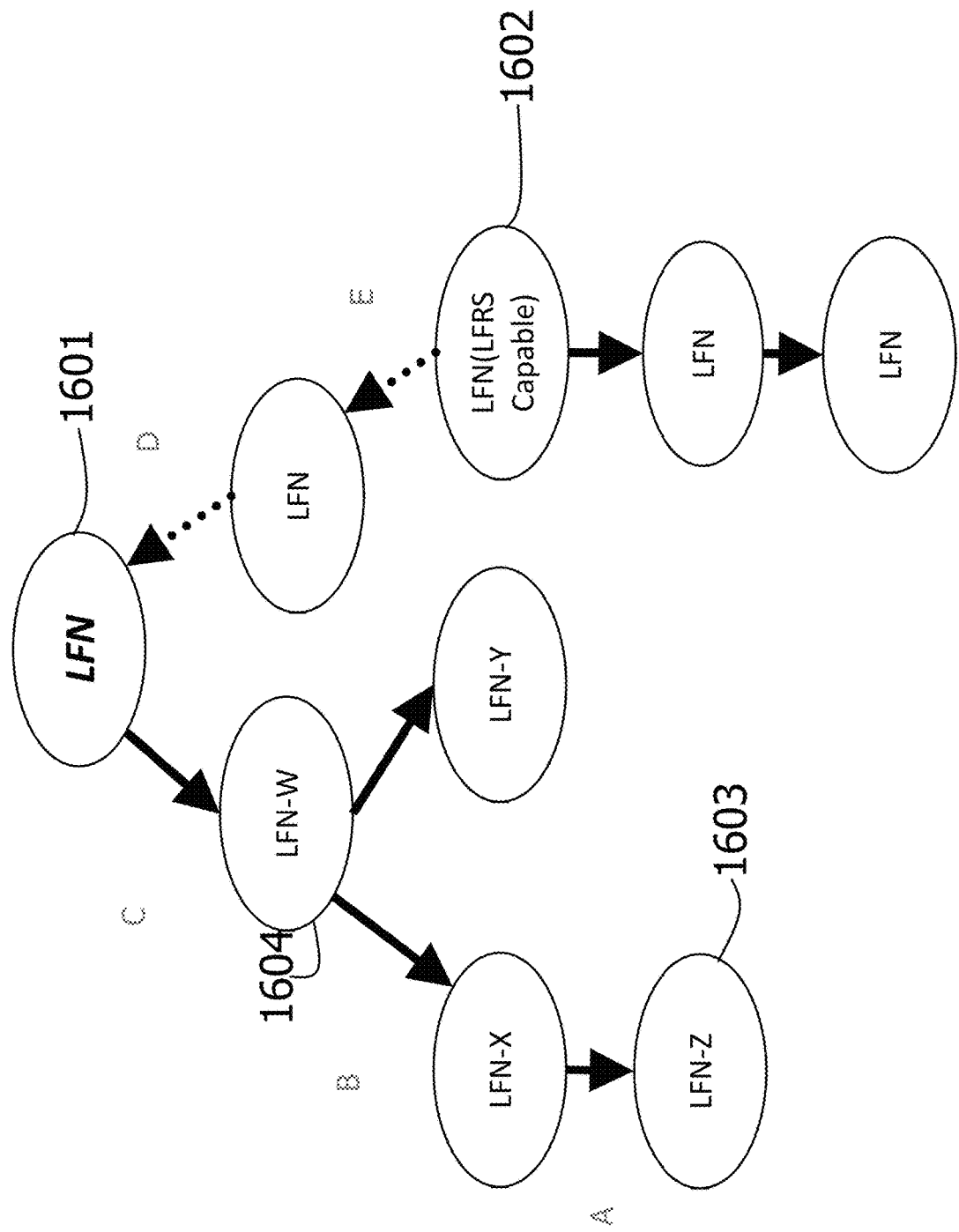
FIG. 16 depicts another logical tree layout of the network components, pursuant to one embodiment of the invention.

In FIG. 16, the LFRS fail-over node has an active satellite link. The topology controller, changes the direction of routing links D and E between 1601 and 1603, see dotted arrows. No other routing paths are affected. Also shown is node LFN-W 1604. Further, since topology controller is coordinating this across the network, packets affected by routing path changes are buffered and sent after the routing is completed. Hence from a client application perspective, the topology change is transparent and disruption free. The topology has self healed with minimal disruption. But it is not optimal. Leaf node LFN 1603 has a circuitous path back to the new "root" node 1602 see A-B-C-D-E. This may trigger a latency/throughput ratio "rule" firing resulting in changes shown in FIG. 17.

Figure 17:
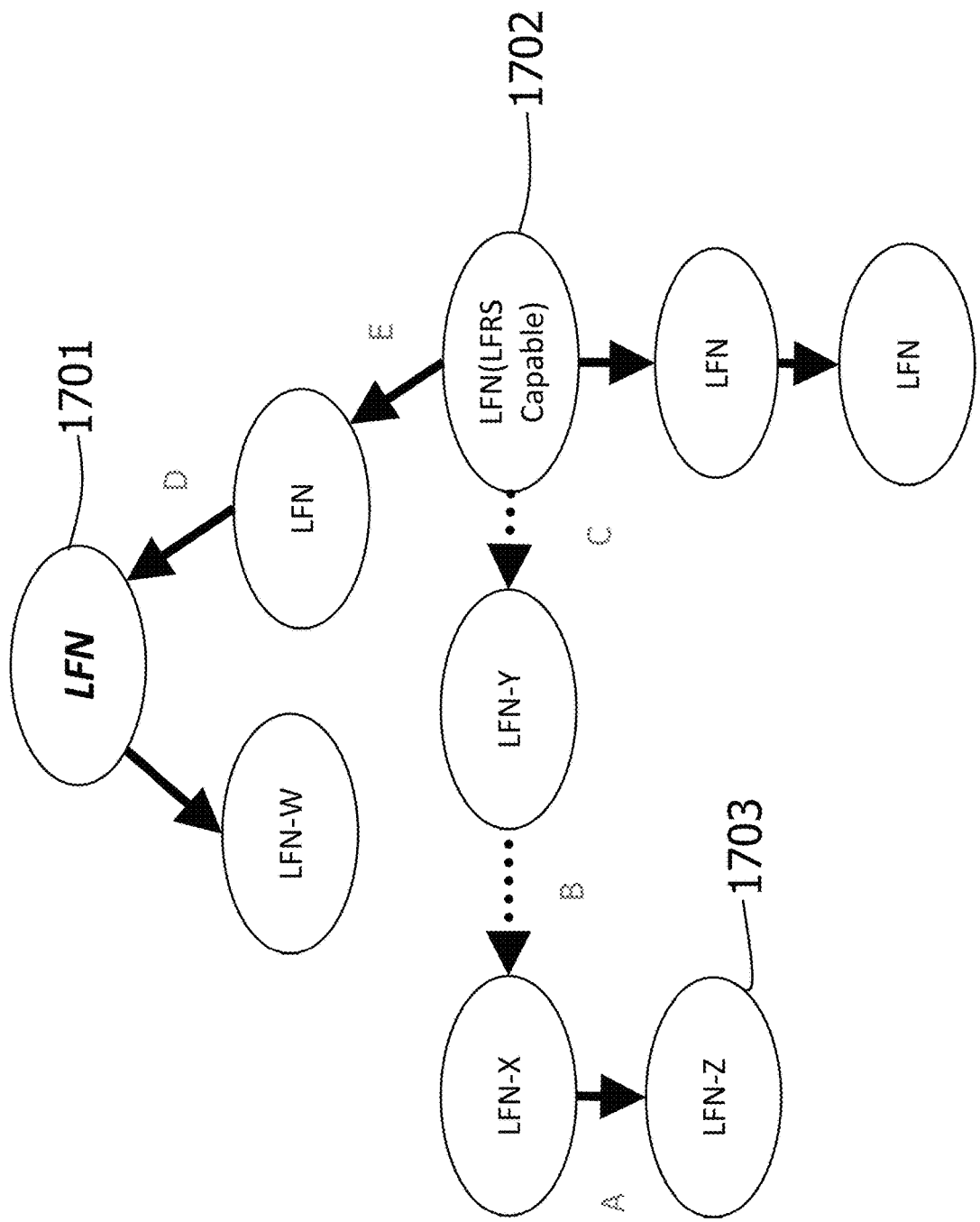
FIG. 17 depicts a reconfigured logical tree layout of the network components, pursuant to one embodiment of the invention.

In FIG. 17, a section of the sub tree is modified by the topology controller to reduce the number of hops for LFN 1703 to A-B-C. Note this change was foreseen in Transition FIGS. 14-15-16, but was not executed till the fail-over LFRS root node was established FIG. 1602. Routing table changes in relevant sub trees are now coordinated through messaging across the nodes to ensure minimal disruption. Further, reduced buffering between transitions also improves link latency. Also shown in FIG. 17 are nodes LFN 1701 and LFRS capable node 1702.

Figure 18:
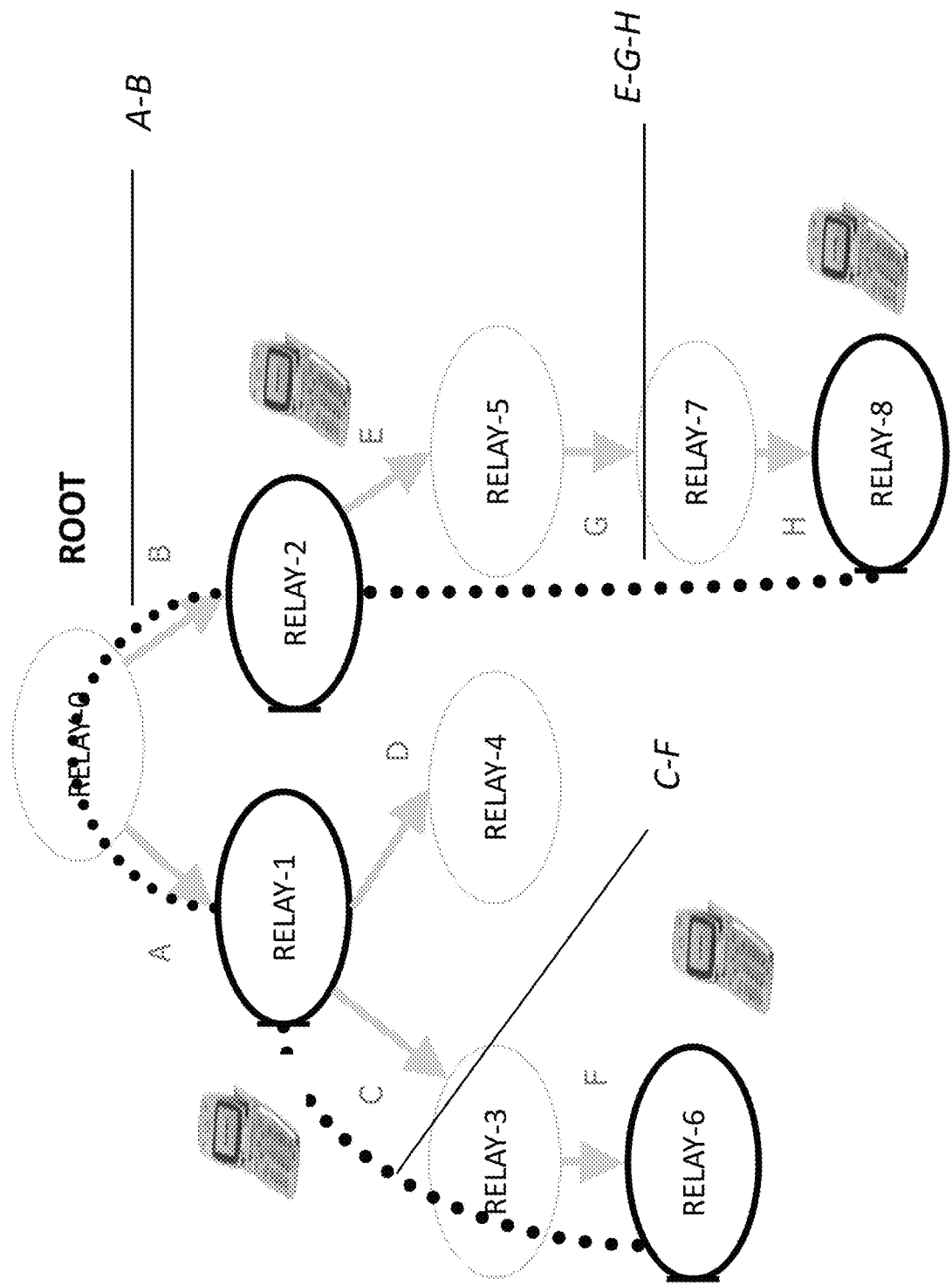
FIG. 18 depicts another logical tree layout of the network components, pursuant to one embodiment of the invention.
Figure 19:
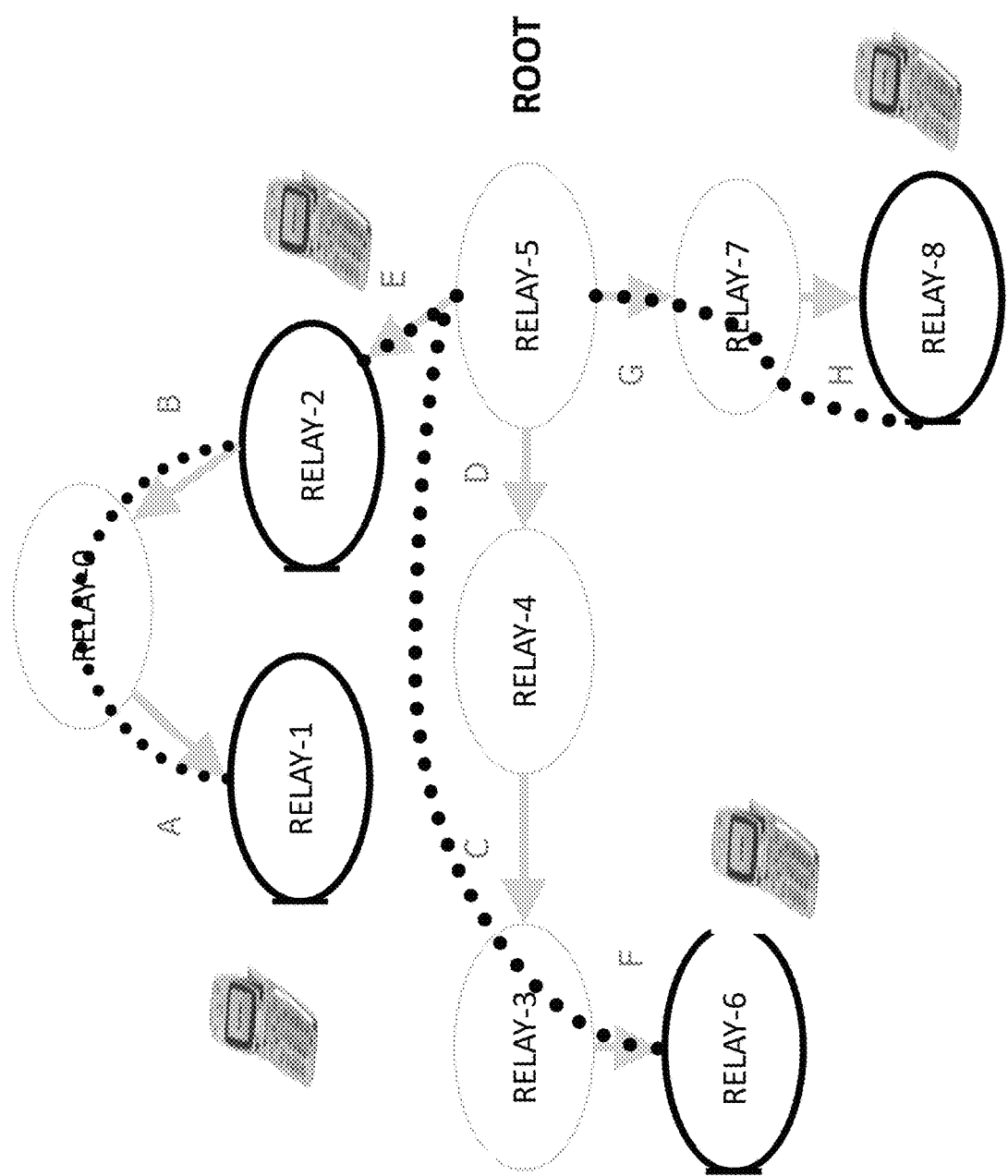
FIG. 19 depicts another logical tree layout of the network components, pursuant to one embodiment of the invention.

FIGS. 18 and 19 teach a simplified equivalent to multi-casting for applications running on the mesh nodes that communicate with each other by subscribing to Topics filters. A topic subscription is illustrated in a conference phone call—a multi-cast, time sensitive message sharing scheme.

Recall this is an instance of a pub-sub framework operating within the mesh nodes comprising a layer II scalable O (n log n) tree based mesh network. Note that Node resident applications, that are connecting the phones shown, are treated as a variant of clients, complete with authenticated and registered MAC-ID level identification, no different from authenticated client stations, e.g. phones. The Application Routing Tables are an overlay on top of a physical tree based communication links Logical links are bound to nodes running application interested in the same topic(s). Since applications both publish and subscribe, Relay-1, Relay-2, Relay-6, Relay-8 ideally share information/messages speedily and with minimum overhead. Dotted lines show the path Relay-1 would take to communicate with any of the conference call members. For example Relay-1 must send messages to Relays-2,6,8 using the routing paths available e.g. A-B, C-F, A-B-E-G-H.

A departure from conventional IP multi-cast is proposed where duplication of unicast message is performed at Relay-1 and then forwarded to paths C-F and A-B. At Relay-2 it is further duplicated and passed on to Relay-8 via path E-F-H resulting in a total of three unicast messages: A-B, C-F and E-G-H with one duplication at B intended for path E-G-H.

In conventional multi-cast, Relay-1 would publish to the multi-cast "hub" typically located at the root node for highest visibility. The "hub" would then send duplicated packets to the members of the multi-cast list. Relay-1 first sends to root (hub)=A then the multi-cast engine, using IP multi-casting, operating at root node Relay-0, will generate paths A-B, B-E-G-H, A-C-F to Relays 2,6,8.

FIG. 19 shows how the routing change for Relay-1 to continue to communicate with others with minimal disruption. It is a reprint of FIG. 17 with the new root being old Relay-5. At Relay-2 the packet is duplicated and forwarded to Relays 6, 8 via path E-G-H and E-D-C-F. The three unicast messages are A-B, E-G-H and E-D-C-F The Application layer generates the port forwarding rules so relevant nodes forward at the port level operating within an Open Flow SDN paradigm, as described in referenced work. This is also referenced as Kernel level extensions, FIG. 1030 in referenced work. As physical routing paths become larger, the jitter and latency of the messaging system may increase, requiring a modification to the affected sub tree by the topology controller operating in conjunction with the MESH CONTROL module FIG. 1040 and FIG. 2103. Note that applications have different priorities and policy directives may be biased to service them at different times of the day. For example, while the voice application is active, the topology may remain sticky, if no other applications are being adversely affected. When conflicts do occur, the application management layer is the first to know, since it monitors and forwards application heart beats and it privy to jitter/latency over the trunk lines overlays employed, see dotted lines.

The application layer must ensure that the logical community of applications and their clients (both other applications and devices like phones) is serviced with minimal disruption and side effect to other applications and clients operating in a multi-tenant community that includes diverse radios and protocols. It provides the multi-cast function with lower overhead and coordinates its efforts in conjunction and coordination with lower level topology management layers that drive changes in physical mesh topology.

Figure 20:
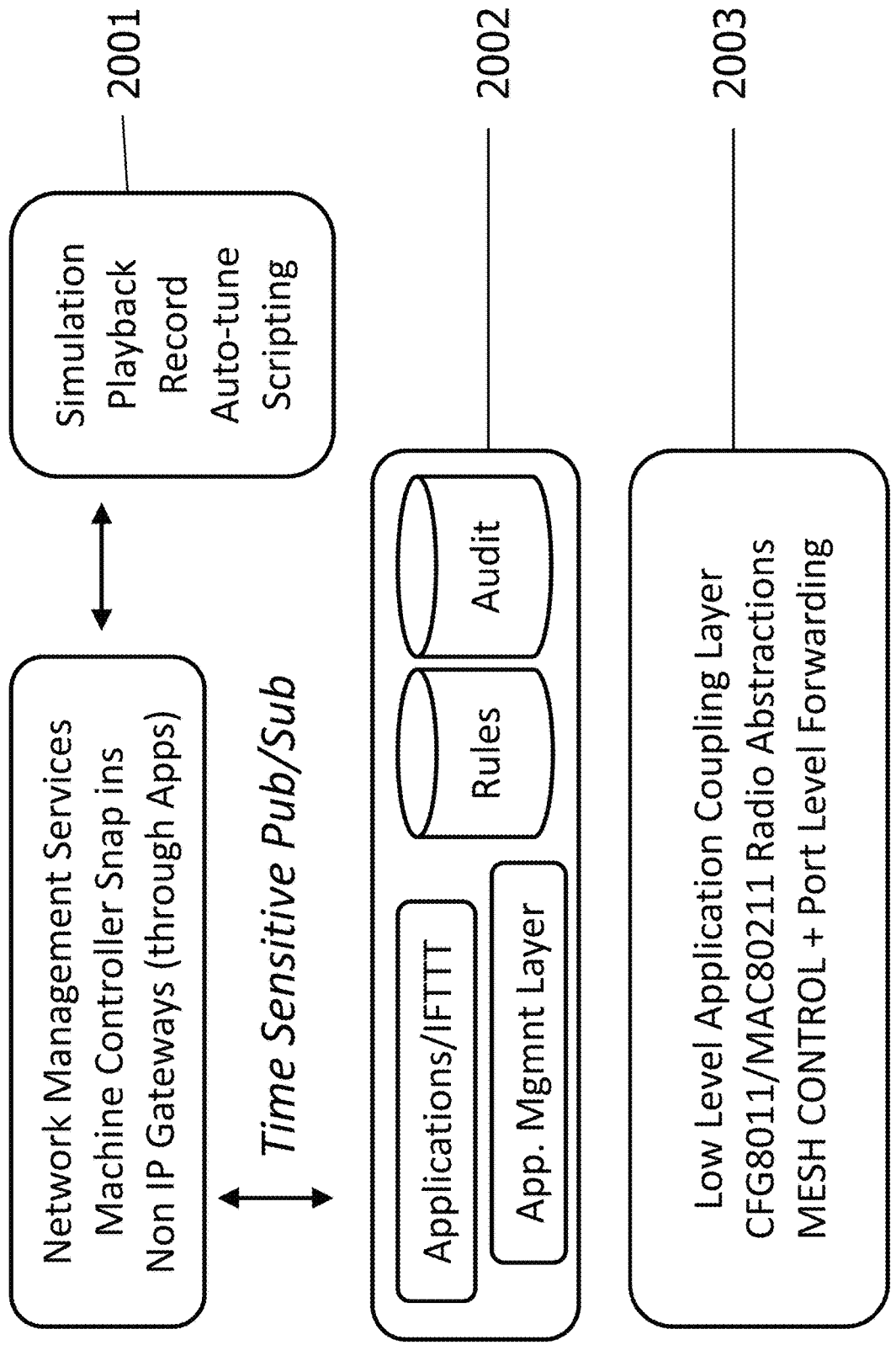
FIG. 20 depicts a schematic of control for network devices, pursuant to one embodiment of the invention.

FIG. 20 is a depiction of the network stack of FIG. 10, highlighting the features provided at three levels/layers of the framework. At the application coupling level 2003, cloud connectivity services include Network Management, Tunnels for Machine controllers and non-IP ("chirp") devices to communicate using Native Machine/Chirp protocols devices operating at the edge of the network. Simulated Movies are generated by simulation models, see FIGS. 1-5, to cover known test cases, using automated scripting tools to playback and record a story board script of initial conditions, FIG. 14, intermediate processes FIGS. 15, 16 to terminating condition, FIG. 17. Converging time from FIGS. 14 through 17 is measured against repeating the same test cases in the real world. A feedback loop between model and reality is thus established to refine the simulation models for subsequent iterations. The refined model includes rule generation and predictive pattern recognition to better predict when the topology controller needs to kick in, or whether the application management layer is capable of addressing the change in RF conditions, client and node movement etc.

The Application Layer 2002 is also shown in FIG. 20. It is the intermediate level. Applications, such as the LFRS parent selection process, or the conference call applications, FIG. 18-19, provide their requirements to the Application Management Layer. This then sets up the port forwarding rules and flow constructs through an application coupling layer 2003. Rules and biases, are stored in the rules database. Application and Mesh node Heart beats are monitored and logged by the Audit database. These logs are retrieved when cloud connectivity is available. The simulation and network management layer 2001 is also shown in FIG. 20.

Node Resident applications have access to lower level functions. For example, the LFRS application FIGS. 14-17 operates at both the Application and Kernel Level. It the application level, it monitors application heart beats and mesh node heart beats. Jitter and latency of both physical and logical links are derived from Audit log trails and help identify potential topology driven bottlenecks. For example see routing path A-B-C-D-E for LFN 1603 reduced to routing path A-B-C for LFN 1703. The logical routing for affected application messaging application is shown in FIGS. 18, 19. A change requested by one application may affect another and hence some form of adult supervision, conflict resolution is supplied at the application management layer, that controls the lower level kernel functions. Recall MESH CONTROL 1050, sits below the APPLICATIONS layer 1060 and above the LINUX KERNEL EXTENSIONS 1030. MESH CONTROL is radio protocol agnostic. Its main objective is to manage channel interference and overall mesh topology per policy directives see FIGS. 1-9, 11. Lower level services perform protocol translations and low level port forwarding rules. Device abstracted network topologies are mapped to the appropriate MAC80211 radio protocol handlers for a diverse and growing set of standards: 80211ac, 80211abgm, Blue-tooth, Cellular, Zig-bee etc.

The framework, FIGS. 10, 11, 20, is thus logical (hardware and protocol abstracted). From the perspective of the network topology management, FIGS. 11, 14-19, algorithms operate on logical link characteristics: throughput, jitter, latency etc. Example: military radios operate in 900 MHz, 2.4 GHz and 5.8 GHz ISM Bands, 4.9 GHz public safety bands etc. Each of these radio+antenna links have differing channel mappings, link quality, antennas etc. To perform the topology changes in FIGS. 14-15-16, the Kernel Level has to modify routing table entries by reversing directions of the logical links. Down-link and up-link port functions are reversed and lower level port interfaces to radios notified.

Complexity of routing moves up to application management, enabling a smaller footprint for emerging low power, simpler edge devices.

Figure 21:
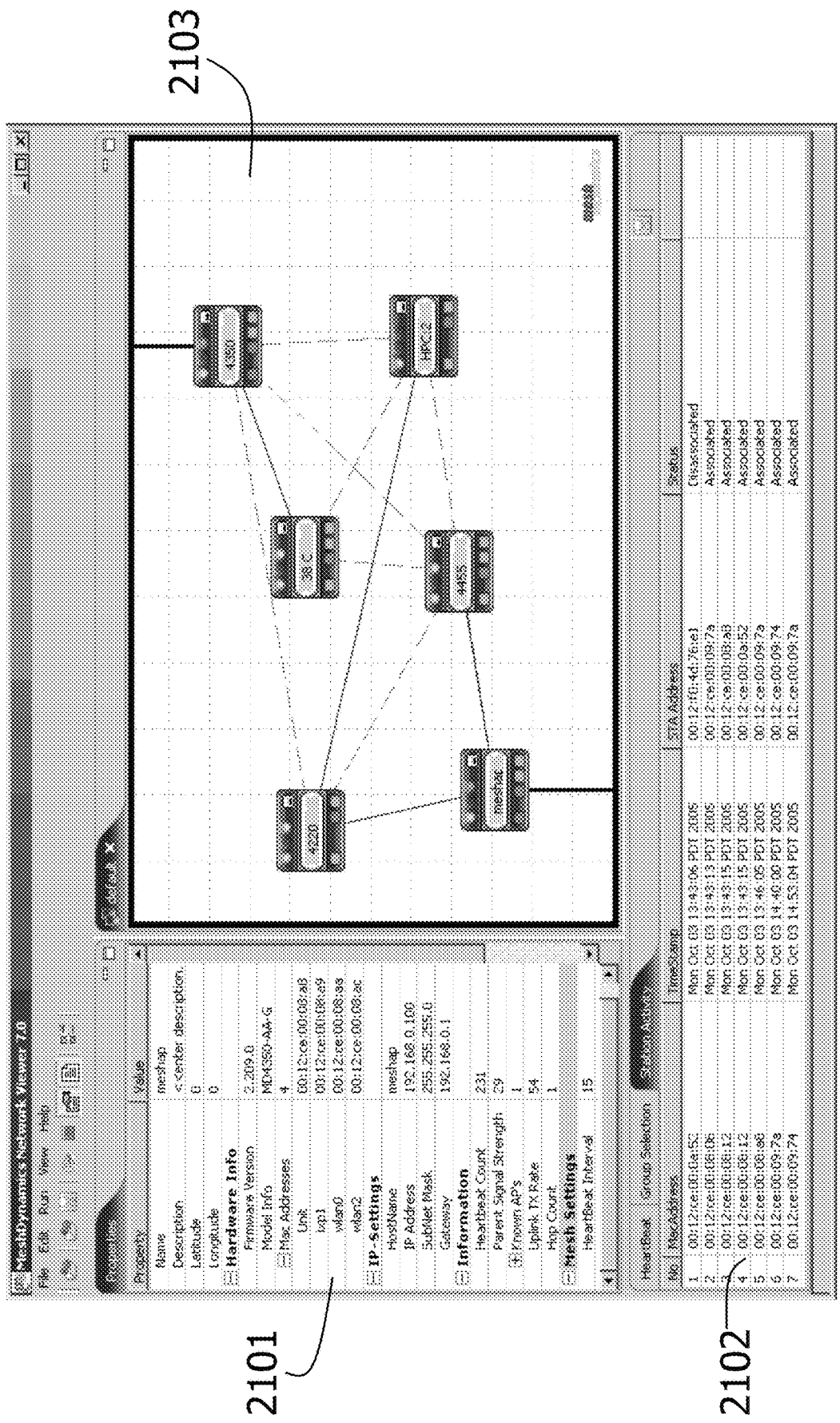
FIG. 21 depicts results of a simulation of one logical network, pursuant to one embodiment of the invention.

FIG. 21 depicts one embodiment of the common Network Management System. It is written in Java and open standard Eclipse GUI and therefore designed to run on all desktop operating systems. The dialog box 2101 is refreshed to show the properties of a node clicked in the network topology window 1603. Applications are treated as clients, complete with a unique MAC-ID and so show up on the property list for any node. Both Application and Mesh Heart Beats may be displayed in the heart beat status updates see 2102. The NMS is used by both simulation and real mesh nodes. Data logs may be replayed, as a movie, to see the transitions in Window 2103. Solid lines depict current active connections. Dashed lines are alternate, fail over paths, derived from adjacency lists and verified/discovered by the SCAN agent abstractions FIG. 1050. Each link has throughput and jitter/latency audit trails and these are available by clicking on a link in the window.

Figure 22:
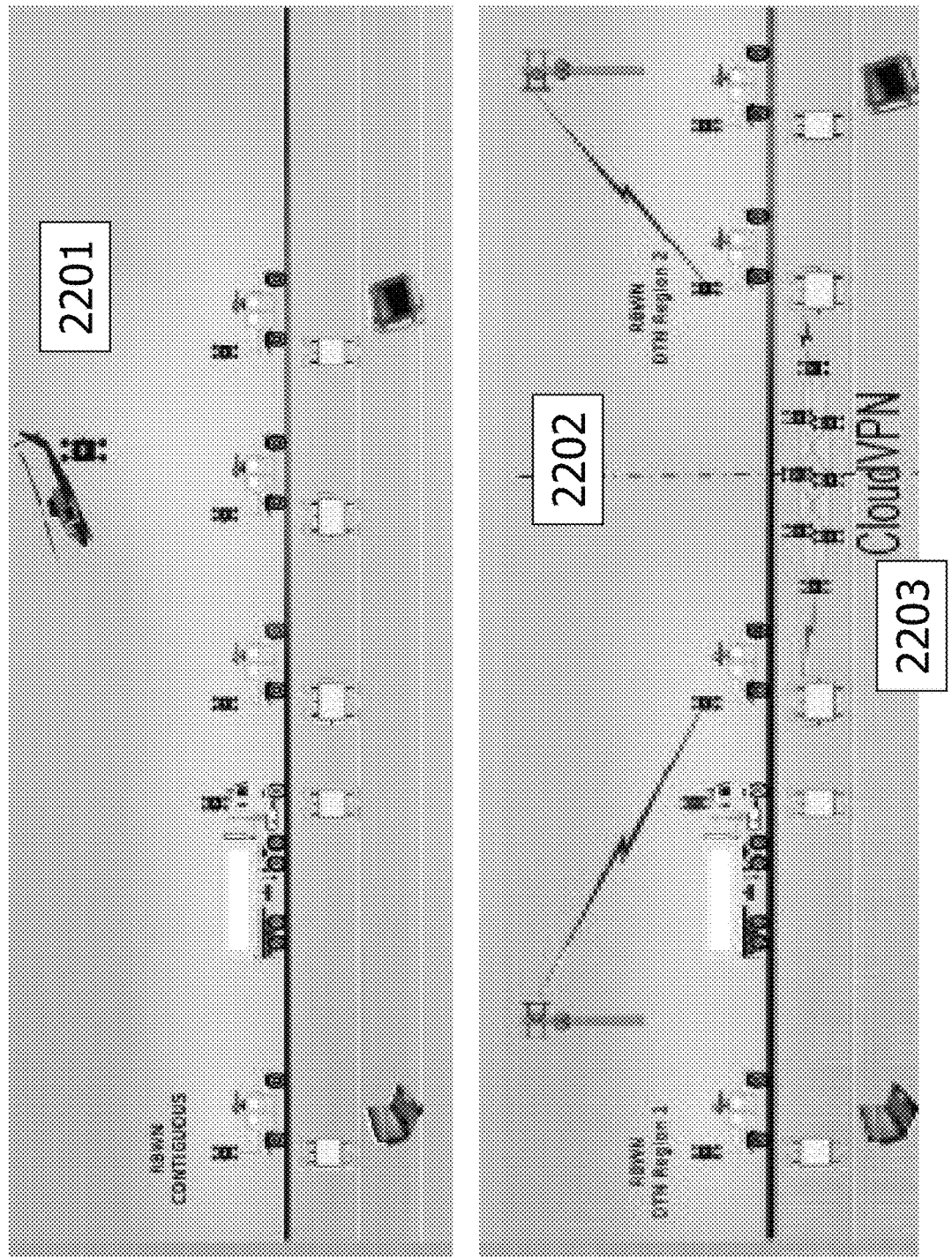
FIG. 22 depicts a schematic of implemented networks, pursuant to one embodiment of the invention.

FIG. 22 demonstrates how Disruption Tolerant Networking (DTN) is actualized in a battlefield scenario. In 2201, there is a chopper connecting two parts of the convoy, which gets broken, 2202 when the chopper leaves. This is akin to FIG. 14, losing the satellite link. Two separate trees are established via LFRS links. Both trees have Internet connectivity. Through the cloud these two trees are no longer isolated. This is referred to as Cloud VPN see 2203.

Figure 23:
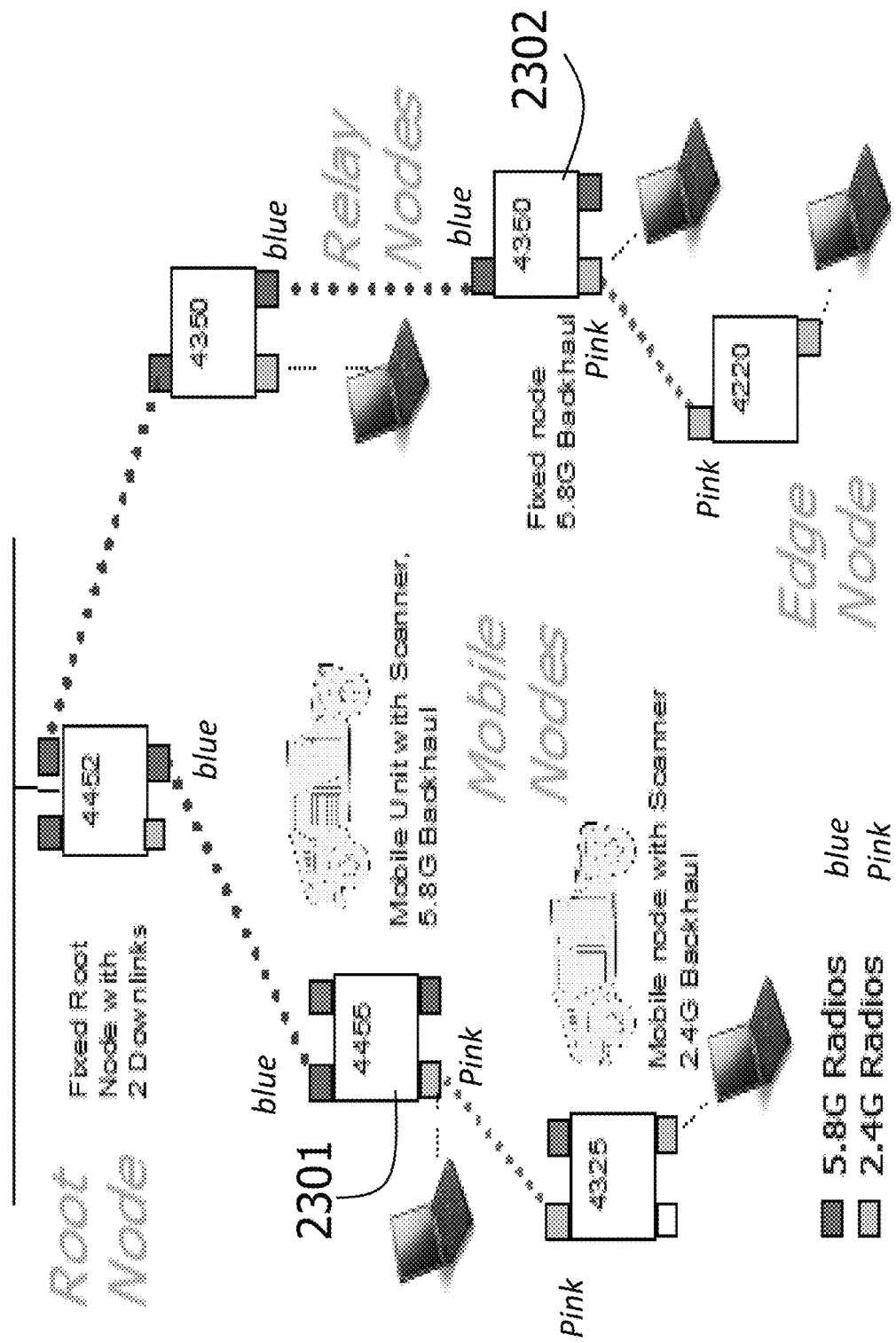
FIG. 23 depicts another logical tree layout of the network components, pursuant to one embodiment of the invention.

FIG. 23 demonstrates how bridging between radio frequency bands enables more devices to operate effectively in crowded RF environments. Non-Interfering RF Channels are limited in each frequency band so bridging across frequency bands effectively adds more channels to the logical channel list see FIGS. 1-9. In FIG. 23, Node 4455, 2301 and Node 4350, 2302 bridge 5.8 GHz (blue) and 2.4 GHz (pink) (logical), two ISM frequency bands. Logical Channel diversity thus expands the available spectrum available to the composite logical network. From the perspective of root node 4452, the mobile nodes are two logical radio hops away. Jitter/latency data from the physical radios drives the aggregated jitter/latency of logical links see FIG. 18-19. This may drive further physical topology changes see FIGS. 14-19.

Note: Radio cards are now available that support concurrent operations in blue and pink frequency bands, FIG. 23. They may therefore be used in lower cost portable hand held units see FIG. 12-01, 12-02. The blue to pink bridging will result in alternating blue and pink links see FIGS. 23-01 and 23-02.

Figure 24:
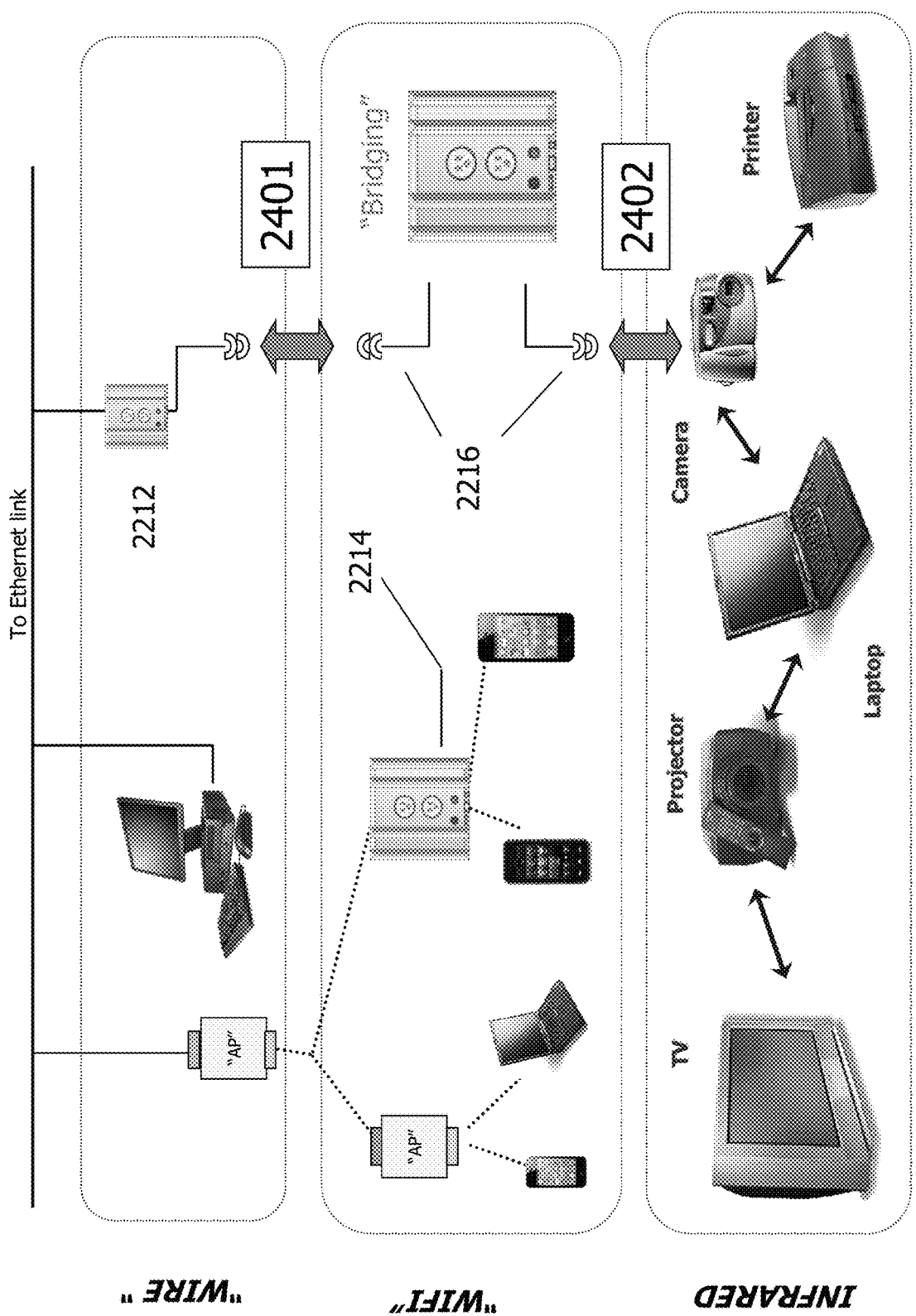
FIG. 24 depicts communications between various network components, pursuant to one embodiment of the invention.

FIG. 24 is another instance of logically composite networks with two instances of bridging, see 2401, 2402.

Figure 25:
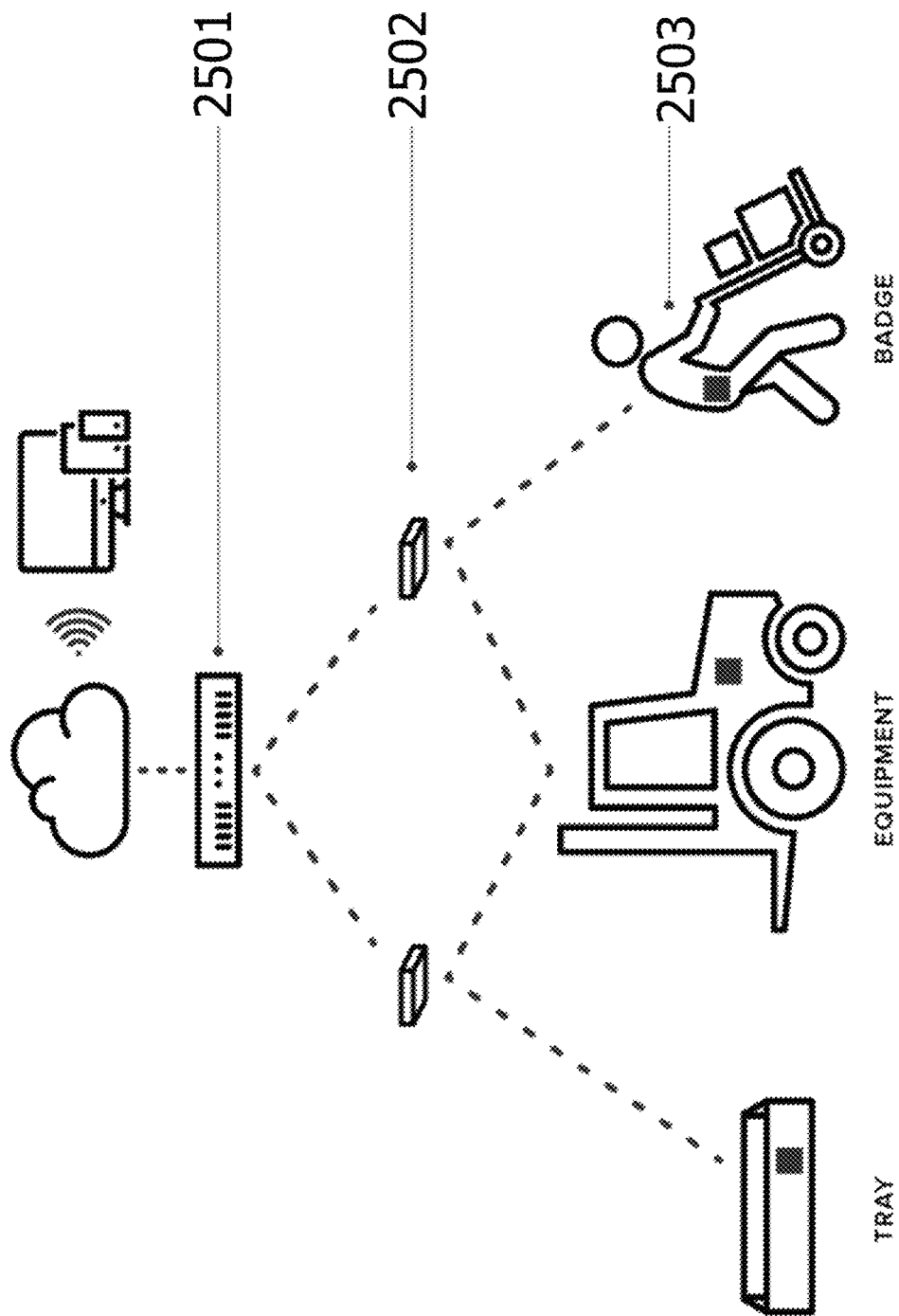
FIG. 25 depicts another set of communications links between network components, pursuant to one embodiment of the invention.

FIG. 25 is another instance of a composite network with bridging between IP Gateways 2501 and RFID Blasters and Readers, 2502. The location of RFID tagged warehouse items is trays, being moved by Fork Lifts and people, 2503. Machine controller applications are managed by the nodes so communications between the layers is coordinated to provide near isochronous performance for time for machine controllers. Details provided in Provisional Application 62/465,526, the contents of which are hereby incorporated by reference. The framework supporting these machine controllers and cloud management is described in FIGS. 20, 21.

Figure 26:
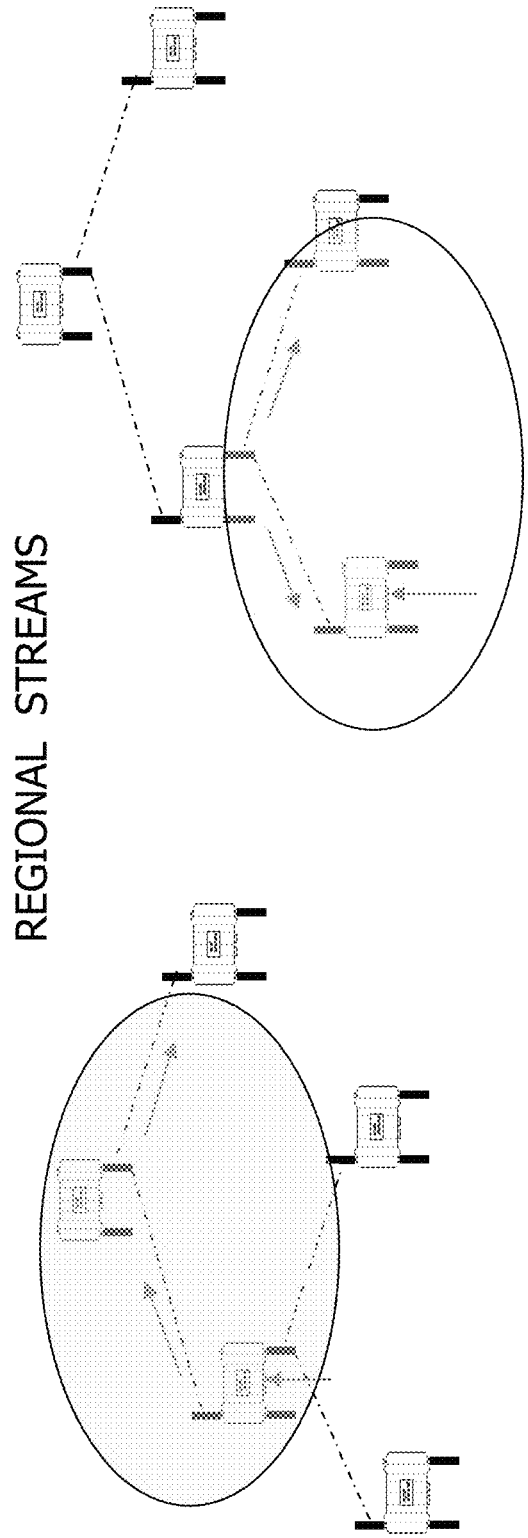
FIG. 26 depicts isolated networks providing services, pursuant to one embodiment of the invention.

FIG. 26, originally from the set of figures in U.S. Pat. No. 9,019,956 B2 (Self-Forming VOIP networks), incorporated herein by reference, first taught methods applicable to supporting voice communications within an isolated network and is revisited in FIGS. 18, 19, 27. The methods were further extended to include regional and global streams, see FIGS. 46 through 49 in U.S. Ser. No. 15/030,4879A1 (Chirp Networks). FIG. 26 is included here for readability.

Figure 27:
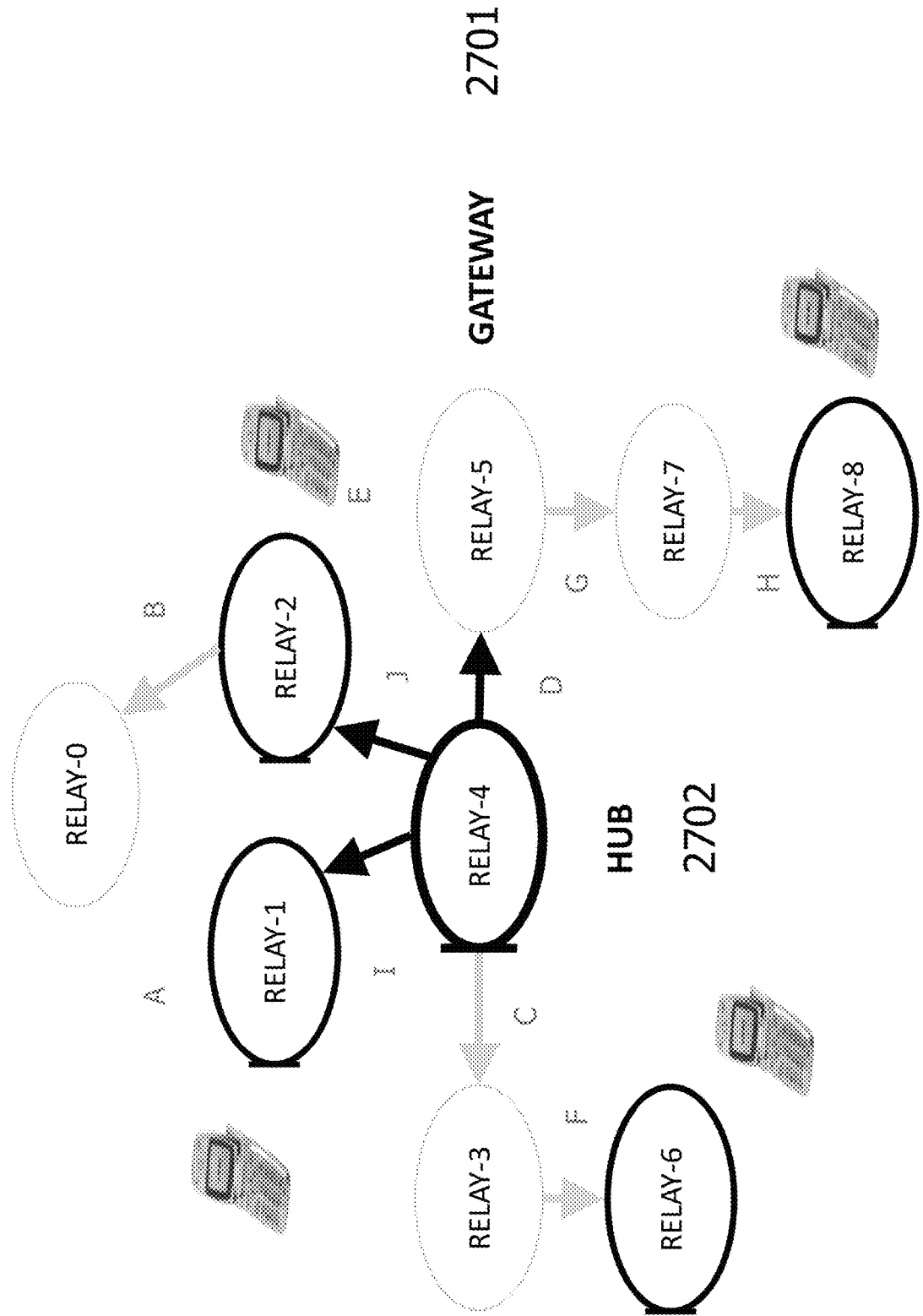
FIG. 27 depicts several wireless network participants, pursuant to one embodiment of the invention.

FIG. 27 is a redraw of FIG. 19, with a REGIONAL stream bias driving the topology controller to change the root node temporarily to Relay-5 2702 HUB. The Gateway continues to provide internet connectivity. Note that the physical location of nodes has not changed from FIG. 19 and FIG. 27. However the network topology is now more application aware and configured correctly.

Details of Specific Embodiments

The description above and below and the drawings of the present document focus on one or more currently embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

In the general case, there are multiple variables in wireless transmissions during parent-child link communications e.g. routing paths A, B, C, FIGS. 16-19.

o transmitters can "speak" simultaneously if they are far apart so neither transmission affects the clarity of the other. Hidden node problems do exist but in general the further apart the simultaneous transmissions, the better, see FIGS. 1-10.

RF Channel Separation: Two transmitters can speak simultaneously if they are operating on separate, non interfering channels. This requires some intelligence at the machine controller level to direct devices to use allocated channels to avoid interference. Channel separation reduces adjacent and co channel interference and engenders simultaneous transmissions within physical proximity, see FIGS. 06-01 et al.

RF Frequency Band Separation: Two transmitters can speak simultaneously if they are operating on separate, non interfering channels. This requires some intelligence at the machine controller level to direct devices to use allocated channels to avoid interference. Channel frequency band separation engenders simultaneous transmissions within physical proximity, with no channel (co-channel or adjacent-channel) interference, see FIGS. 12, 23, 24, 25.

RF Timing and Synchronization. Packets may be delayed or prioritized, using Quasi-TDMA time slicing and time sensitive mass-transit shuttle services. The RF medium congestion is thus addressed through variants of time slicing, see U.S. Pat. No. 7,583,648B2 through provisional 62/465,526, incorporated herein, by reference.

The above methods taught refer to efficient transmission from a parent downlink logical radio to a child uplink radio, in compliance with the tree-based switch stack paradigm. This application focuses the the logical link topologies, see FIGS. 1-9 and FIGS. 14-19. Our intention is to modify the current network topology to suit the requirement of multiple applications being serviced. These include fail over strategies, efficient voice multicasting, Internet of Things edge device management etc.

Methods taught in U.S. Pat. No. 8,976,733 B2, "Persistent mesh for isolated mobile and temporal networking," the contents of which are incorporated herein by reference, are reviewed. Those methods teach the "rules" under which an isolated cluster of nodes, splits and merges with other clusters, FIG. 13, reprinted from that application. Two root like nodes are depicted LFR 1311 and LFR 1321 in isolated clusters 1310 and 1320. A merged cluster 1330 is formed with LFR 1311 retaining its title and LFR 1321 being demoted to LFN 1321.

These methods taught operate on logical links and hence support a generic, radio and protocol abstracted logical network topology controller, applicable to both physical links (e.g radio to radio) and virtual links (e.g application to application).

U.S. Pat. No. 8,976,733, the contents of which are incorporated by reference, teaches methods, trademarked as P3M technology, to enable a node or set of nodes to remain functional without the presence of a wired root node see FIG. 12. Note that is FIGS. 8-9 there was a fall back wired path to connect to. There is no wired link in FIG. 12. Typically, when a wired mesh network loses contact with its root node, all connections within the network are broken. Clients within the mesh no longer transfer data to and from other clients. In disruption tolerant applications DTN) FIGS. 12,22, we wish to retain client-to-client connections—even when the presence of a wired root node is lost. P3M technology allows a wireless mesh network to remain intact in such an event and keep internal communications alive while each node scans and searches for wired (e.g. Internet) connectivity.

U.S. Pat. No. 8,976,733 also teaches how, when a root node is lost, The "branches" or islands of nodes left in the absence of a root node will form their own mesh network, see FIG. 13. Clients within these individual mesh networks will retain connections with each other. In each of the new "P3M" meshes, a node is designated as the root node for that particular mesh. This node will have the same functionality as a wired root node with respect to passing network traffic between its child nodes via its down-link radios but no Internet connectivity. This was defined as a LFR or Limited-Functionality-Root. Meanwhile, the up-link of a P3M root node will scan for wired mesh networks, or other P3M mesh networks. When one is found, the arbitration repeats. One intent is to recruit as many scanning nodes as possible, in the hope of finding a wired connection (Internet connectivity) sooner. Another intent may be to build a more contiguous network so isolated networks are now sharing voice and data internally with each other, if not with the outside world.

U.S. Pat. No. 8,976,733 also describes methods to select which of multiple LFR nodes should be chosen to "lead" the merged tree. The other LFR nodes are automatically demoted to LFN see FIG. 13. and per "rules" This is performed by the MESH CONTROL FIG. 10, 21, which subsequently reorders the routing paths to ensure the network remains contiguous, see FIG. 13, 8100, and FIG. 22-03. The configurable preference list—deciding which node leads—is taught as FFR-FFN-LFR-LFN where:
1. FFR (Fully-Functioning Root) A node with a wired network connection. See FIGS. 1-9.
2. FFN (Fully-Functioning Node) A node that is part of a mesh which is rooted by an FFR. See FIGS. 1-9.
3. LFR (Limited-Functioning Root) A rooting node, but does not have an actual wired network connection. LFR Root nodes are shown in FIG. 12, element 1203 and 1311, 1321.
4. LFN (Limited-Functioning Node) A node that is part of a mesh which is rooted by an LFR. LFN nodes are shown in FIGS. 12, 13.

RF Power Levels and Proximity

Illustrative rules of merging clusters, FIG. 13, operating on the preference list FFR-FFN-LFR-LFN, are summarized below:
A. If up-link of an LFR receives the beacon from an FFR or an FFN, it will associate, becoming an FFN.
B. If up-link of an LFR receives the beacon from an FFR or an FFN, it will associate, becoming an FFN.
C. If up-link of an LFR receives the beacon from an LFR or LFN of a different P3M mesh network, it will associate, becoming an LFN.
D. If up-link of an LFN receives the beacon from an LFR or LFN of a different P3M mesh network, it will ignore the beacon and remain part of its own P3M mesh.

Operating on Dynamic Hierarchy Lists

The SCAN function, FIG. 10 attempt to find a parent so its node moves up the hierarchy ladder towards FFR. Being closer to root nodes engenders better throughput with internet services, operating on the Northward bound side of the node tree. It also has reduced latency (fewer hops to the cloud). The hierarchy/preference FFR-FFN-LFR-LFN thus favors applications that need cloud connectivity. Another set of applications, see FIGS. 18-19, shown a smaller trusted community within a local mesh tree, see phones connected through trusted applications operating on multi-cast subscription list e.g. Phone conferencing. The topology controller then operates on restricted Hierarchy e.g. LFR-LFN with further restrictions to limited trusted nodes and networks managed by the Application layer see FIG. 20.

Regardless of the number of modes in the hierarchy list, the Core P3M formation rules should apply since they all operate on a preferences list and logical linked trees. Changing the preferences simply changes the list of options available for P3M formation. Modes of operation may be added, modified or removed. Some nodes may have additional functionality. This hybrid and heterogeneous interoperability provides more connectivity options and is desirable, see FIG. 23 where models with different radio links, and number of radios is shown, see root model 4452, connected to models 4350, 4455 etc., pink and blue links and differing number of radios.

Consider a new proposed model supporting a new mode of operation: LFRS (Limited-Functioning Root-Satellite) mode, FIGS. 14-17. A LFRS node is shown rooting a P3M mesh, but does not have an actual wired network connection as in FIGS. 1-5. However, one of its 4 slots is capable of providing internet connectivity via satellite. albeit at a lower throughput than a wired connection supplied by an FFR. In the hierarchy of preferences, a scanning (unconnected) node may prefer: FFR FFN LFRS LFR LFN.

Fail-Over Between Two LFRS Nodes

This example illustrates disruption-free topology changes.

FIG. 14-16 illustrate application of FIG. 13 for new additions to hierarchy preferences to include a new mode, LFRS. In FIG. 14, the root node 1401 is shown as a LFRS node, which is a node capable of satellite communications (LFR-Satellite) and therefore shown active in a mobile isolated tree comprising of another inactive, redundant/fail over Satellite capable LFRS 1402, mesh node currently operating dormant and in LFN mode. In FIG. 15 the LFRS root node 1501 loses it Satellite connectivity. This demotes it to LFR status thereby preserving the network topology and routing links. No routing paths are changed. A notification is sent to wake up LFRS capable node 1502. When the satellite connection is active, the topology controller is informed.

In FIG. 16, the LFRS fail-over 1602 node has an active satellite link. The topology controller, operating within MESH CONTROL, changes direction of routing links D and E between 1601 and 1603, see dotted arrows. The routing path changes are localized and the entire tree is not affected. Further, since topology controller is coordinating this across the network, packets affected by routing path changes are buffered and sent after the routing is completed. No packet loss occurs.

Hence, from a application perspective, change is transparent and disruption free. The topology has self healed with minimal disruption. But it is not optimal. Leaf node LFN 16-03 has a circuitous path back to the new "root" node 1602 see A-B-C-D-E. This may trigger a latency/throughput ratio "rule" firing resulting in changes shown in FIG. 17. In FIG. 17, a section of the sub tree is modified by the topology controller to reduce the number of hops for LFN 1703 to A-B-C. Note this change was foreseen in Transition FIGS. 14-15-16, but was not executed till the fail-over LFRS root node was established 1602. Routing table changes in relevant sub trees are now coordinated through messaging across the nodes to ensure minimal disruption.

Multi-Cast Routing Simplified for Application Aware Pub-Sub Framework

FIGS. 18 and 19 teach a simplified equivalent to multi-casting for node-resident applications that communicate with each other by subscribing to Pub-Sub Topics filters. One such topic subscription is illustrated as a conference phone call—a multi-cast, time sensitive messaging scheme connecting physical edge devices (phones). The devices are being serviced by applications on the connected nodes in this example. As the client/station/device moves, applications would typically "move" with it, actively tracking the movements of the client so as to remain connected. The application then moves from one node to another, if needed, to ensure that the virtual pub-sub communication network remains healthy. This is a variant of mobile temporal networking FIG. 12, 22, 23, where the client stations are moving and the mesh nodes and their applications need to track them, to service them and is described in references.

In FIG. 18, Relay-1, Relay-2, Relay-6, Relay-8 ideally share information/messages speedily and with minimum overhead. Dotted lines show the path Relay-1 would take to communicate with any of the conference call members. For example Relay-1 must send messages to Relays-2,6,8 using the routing paths available e.g A-B, C-F, A-B-E-G-H, see arrows. A departure from conventional multi-casting is proposed where duplication of unicast message is performed at junctures, with lower overhead.

In FIG. 18, Relay-1 forwards to paths C-F and A-B. At Relay-2 it is further duplicated and passed on to Relay-8 via path E-F-H resulting in a total of three unicast messages: A-B, C-F and E-G-H with one duplication at B intended for path E-G-H.

FIG. 19 shows how the routing change for Relay-1 to continue to communicate with others with minimal disruption. It is a reprint of FIG. 17 with the new oot being old Relay-5. At Relay-2 the packet is duplicated and forwarded to Relays 6, 8 via path E-G-H and E-D-C-F. The three unicast messages are A-B, E-G-H and E-D-C-F.

By contrast, in conventional multi-cast, Relay-1 may publish to the multi-cast "hub" located at the root node for highest visibility. The "hub" then sends duplicated packets to the members of the multi-cast list. Thus, Relay-1 sends to root (hub), path A. The multi-cast engine, at root node Relay-0, generates paths A-B, B-E-G-H, A-C-F to Relays 2,6,8. There is more duplication and hops in this conventional approach.

Note that the applications operating on the mesh nodes are treated as special clients with access to lower level transport functions, see Application Management Layer, FIG. 20, 21. Lower level port forwarding rules may be generated automatically, so duplication of paths and routing takes place at the mesh node kernel and costly routing table looking overhead in eliminated. By contrast, IP Multi-casting has to operate at the IP level and cannot access lower level port forwarding easily. Time sensitive, latency aware, Application level, Pub-sub messaging becomes feasible, at lower overhead and higher effectiveness for low cost edge devices.

Testbed Framework for Self-Tuning Networks.

FIG. 20 is a depiction of the network stack of FIG. 10, highlighting the features provided at three levels/layers of framework, developed to design, prototype, deploy and refine mesh networking strategies for large industrial enterprise networks that are:

1. Disruption Tolerant—multiple applications are running, both resident on nodes and on client stations (e.g. phones, laptops) must be serviced to support a contiguous connectivity while transitions are occurring. The conference call, FIGS. 18-19 should ideally not be affected. The application management layer 2003 should ensure that the packets are buffered while routing paths are changed. No packet loss becomes especially relevant for remote machine controllers communicating with edge machines over near isochronous links. Time sensitive messaging may also require time stamps and time synchronization between mesh nodes for accurate audit trails.

2. Channel-Diverse. The Logical Radio concept is based on logical link values and logical channels, FIGS. 1-9. The actual RF channel frequency used for an up-link-to-down-link link is Dependent on the radio type (WiFi, Satellite, Cellular) and the Frequency Band it operates in. Within that Frequency band, multiple channel options exist with varying interference with adjacent channels of nearby radios or external RF interference. This is addressed by Dynamics Channel Management, see FIGS. 1-9.

Large scale networks must deal with Channel congestion and its detrimental side effects to throughput, retries (latency) etc. Hence Channel Diversity is encouraged. In FIG. 12, two frequency bands, Red and Blue are used to segment the RF collision domain and dynamically manage co-channel and adjacent-channel interferences. Similarly in FIG. 23, the bridging is alternately Blue-pink for a two hop path from root to mobile relay 23-01, 23-02.

3. Tree Based. Large scale networks follow Natures examples and are logical tree based. Trees based logical radio routing scales as O ($n$ log n) for scalability and the future proof design. Subtrees within the logical tree may operate in differing preference lists and profiles. The topology management of these sub trees may use a different hierarchy list (e.g. LFR-LFN only). When the entire industrial network is modeled as a merging and splitting of trees, see FIG. 13, each sub tree may have its own profile for the current use case and be modeled correctly within the framework. Recall applications running within those sub trees, service a local community, using Pub-sub, for example, and may form their own virtual sub trees. The topology management and self tuning algorithms can thus operate on both real and virtual logical sub trees concurrently, with boundaries defining the range of its operation.

4. Evolutionary: Topology and Channel changes are endemic to large scale networks. Application and clients must be serviced with minimal disruption while transitions occur FIGS. 14-19. Self-tuning becomes more complex as more applications operate within the multi-tenant environment. RF space may become congested in some areas, caused by client congestion. That forces more clients on a single channel and channel thickness must now be increased (bonding channels). But this reduces the available channels for Dynamic Channel Management to work with. The side effects must thus be modeled and rules/scripts generated and tested through continuous learning—starting with rough simulation models, refining them though real world data etc. At some stage of the refinement/iteration, the simulation model and real world model are running concurrently, sharing information when possible. We call this an evolutionary system—the simulation model is running what-if scenarios and pattern matching to "evolve" the current physical network to its next generation of more advanced scripting rules etc.

The framework FIG. 20 supports design, prototype/simulate of network models, then refine the models with real world data to provide continuous what-if scenario analysis and crisis prevention. At the top level 20-03, cloud connectivity services: Network Management, Tunnels for Machine controllers for edge devices and applications resident on those devices or the mesh node inf. 2003 provides the capability to generate movies/playback what-if scenarios of transition changes, derived from heartbeat and audit logs 20-02 for all applications and their clients (e.g. phones, laptops) FIGS. 22, 23, 24, 25.

Simulated Movies are generated by simulation models, see FIGS. 1-5, to cover known test cases, using automated scripting tools to playback and record a story board script that covers the following states of the finite state machine (FSM): initial conditions, FIG. 14, intermediate processes FIG. 15,16, terminating conditions, FIG. 17. Consider transitions depicted FIGS. 14 through 19. FIGS. 14-17 depict the mesh topology changes needed to re-establish satellite connectivity, see FIG. 22. In the hierarchy list FFR FFN LFRS LFR LFN, this ranks pretty high. However, while these transitions occur active application services are affected, see FIGS. 18, 19, 24, 25. In FIG. 18, the multi-cast equivalent routing scheme generated forwarding table rules for A-B, C-F, Duplicate at B, Forward to E-G-H, see dotted lines. This changes in FIG. 19 to A-B (no change) then E-D-C-F and E-G-H. The aggregated latency at each hop of the routing path e.g. E-D-C-F must be evaluated vs When topology changes are proposed. Simulation models thus operate on insights gained from real world validations and derived from app and station heartbeats and audit logs 2002.

The physical network may ask of its cloud clone—what should I do? and then receive a script/rules update/directive. Unfortunately, this requires cloud connectivity which is not assured in disruption tolerant environments, see FIG. 22. Therefore the wisdom should have been downloaded before. This requires that the cloud clone sees ahead, and using pattern recognition from past history and makes probability assessment of potential changes needed by all affected nodes, their application, and their clients. It then runs a movie, showing the network changes, see FIGS. 1-9. A visual tool to depict all this information is shown in FIG. 21.

On approval the appropriate script is downloaded. When run, the audit logs refine those IF-THEN (IFTT) rules sent 2002. As models refine, the real world and simulated models converge and the network can function with intermittent connectivity for longer periods, since the rules have evolved to include more use cases and therefore more look ahead. Decision Trees are developed through this process and the rules generated may be customized for diverse use cases.

In FIG. 20, element 2002 depicts the intermediate (Application) level that runs on rules for LFRS parent selection or multicast conferencing. Applications provide their requirements to the Application Management Layer that sets up port forwarding rules and flow constructs through an application coupling layer see 2003. Rules and biases are stored in the rules database, pertinent to the current use case profiles. Application and Mesh node Heart beats are monitored and logged by the Audit database. These logs are retrieved when cloud connectivity is available to drive the rule generation process offline.

FIG. 22 demonstrates how Disruption Tolerant Networking (DTN) is actualized in a battlefield scenario. In 2201, there is a chopper connecting two parts of the convoy, which gets broken, 2202 when the chopper leaves. This is akin to FIG. 14, losing the satellite link. Two separate trees are established via LFRS links. Now both trees have Internet connectivity and through the cloud can talk to each other. This is referred to as Cloud VPN see 2203. Phone conferencing is an example application that may be active while a DTN event shown is occurring. The objective of the Framework is to learn to self-tune its topology, with the help of a cloud based clone, to predict and pro-actively change its topology with minimal changes to routing paths or services using those paths.

Driving Self Tuning Through Generic Guidelines

Consider a policy directive that has been set for the network shown in FIGS. 14-16. The rule states that the maximum number of hops from a root node not to exceed 3 hops, The topology controller then notes that LFN 1603 has a hop cost of 5: see Path A-B-C-D-E to new root node 1602. Further the sub tree it belongs to includes an ancestor 16-04 with the maximum allowable hops of 3: C-D-E. The Subtree 1604 needs attention.

Nodes LFN-X, LFN-Y and LFN-Z all violate the max allowable hops setting=3 similar to FIGS. 1-9. They need to find parents with hops 2 or less. FIG. 17 depicts the solution determined through evaluating alternate routing for LFN-X, LFN-Y, LFN—Z based on current RF conditions and the location of nearby nodes to serve as parents. As noted above, the simulation model uses recent link quality and node placement (e.g GPS location) to updated the virtual clone of the real world physical network. Hence, the simulation model can now propose topology changes, see also FIGS. 1-9.

Similarly policy directives may be set for overlay networks e.g. application messaging, running on top of the physical level. The application community FIGS. 18-19 may specify that the overall jitter/latency from any member of the community cannot exceed 20 ms, for VOIP. If the current latency is 5 ms per physical link hop then the max hops is set at 4 physical hops away, when application is active in teleconferencing/multi-cast mode.

In FIG. 18 the path from Relay-1 to Relay-6 is C-F. This degrades to A-B-E-D-C-F in FIG. 19. A preference of maintaining hops not to exceed 3 will drive FIG. 16 towards FIG. 17. But before it is executed, the system will check where the applications are residing on the affected nodes LFN-X, LFN-Y and LFN-Z, FIG. 16. It is noted that the change will affect the application on Relay-6 adversely.

Here is where the application management and arbitration layer steps in. If the teleconferencing session is active, the topology may be directed to remain sticky till it is completed and options are reevaluated. As an example, when the tele-conferencing session is over, the topology changes from FIG. 18 to FIG. 19. The teleconferencing applications on Relays are no longer active clients. Other applications, that had lower priority, now demand a topology change from FIG. 16 to FIG. 17. When the teleconferencing applications become active again, a topology reversal from FIG. 17 back to FIG. 16 is requested.

With the ability to rapidly re-route, in place, rules are generated that state:

1. When VOIP teleconferencing is active, it has priority over other applications in the relevant sub tree.
2. Review current throughput/jitter/latency data for the links A, B, etc.
3. Derive the current jitter/latency between servicing applications. e.g Relay-2 to Relay-6.
4. Determine if in compliance with Application specification in stipulated Service Level Agreements.
5. Move the applications over to the mesh nodes, if that alleviates problems, else
6. Request a physical topology change from FIG. 17 back to FIG. 16.
7. Retain stickiness, in effect delaying topology change back to FIG. 17, while application active.
8. Release control for other applications to drive topology changes.

Note that from Step 7 to Step 8, there may be no clients/applications requiring a topology change. Another rule could be to remain in the current state, encouraging less switching back and forth. Thus the rule decision tree "grows" and is customizable for diverse extensions derived from example decision trees. A library of decision strategies maintain the ancestry of decision trees, so the system can fall back to a previously tested process flow.

Over time, it is noted, from audit logs, that phone conferences take place every Wed morning 7-9 am. This information may also be manually entered as a rule. The Network topology can thus run on schedules, rapidly changing topologies between 7-9 am on Wednesdays to favor VOIP for phones connected. Note that both the location of the applications (on the nodes) and client phones may have changed but generalized setting of jitter/latency still drive the hop count latency rules operating on a logical model of the network. The decision tree may also include conditionally sequenced operations in the form of automated scripts, see sequence FIGS. 14→15→16.

GLOBAL and REGIONAL Streams Biases Revisited

U.S. Pat. No. 9,019,956 B2 (Self-Forming VOIP networks) first taught methods applicable to supporting voice communications within an isolated network and is revisited in FIGS. 18, 19, 26, 27. The methods were further extended to include regional and global streams, see FIGS. 46 through 49 in U.S. Ser. No. 15/030,4879A1 (Chirp Networks). FIG. 26 is included here for readability.

At the core of both regional and global streams is the question—where are the subscribers/clients?

When the subscribers are on both sides of the network—that is root downward and root upward, then a GLOBAL stream overhead is justified. An example would be the VOIP phones connected to each other (in a rooted sub tree) but also have conferencing with phones on the other side, beyond the root node to the cloud via internet gateways north of the root node. In FIG. 22-03, for example, the CloudVPN is connecting phones and devices on two different Satellite-aware root nodes to the cloud.

When the bias is towards GLOBAL connectivity then the parent selection algorithm prefers a parent closest to the root. This is good for both throughput and latency of northbound, internet dependent, traffic. Hence the hierarchy list FFR FFN LFRS LFR LFN. The bias towards being as close as possible to an internet gateway is clear for GLOBAL streams.

The power of an application framework, FIG. 20, is that through simulation we can experiment (and learn) other biases, more suitable to the clients using the multi-tenant network infrastructure and proactively change the network topology accordingly.

FIGS. 18, 19 are REGIONAL streams but the gateway bias is in effect increasing latency for the voice conferencing application. In FIG. 27, the network reforms with an affinity around Relay-4 HUB. 27-02 as a temporary root node. Note that the (old) root node, RELAY-5, 27-01 is still active as a gateway. Routing paths have changed but internet connectivity is still active.

RELAY-5 was chosen as the HUB (temporary root) in this example because it is nearest the centroid of the REGIONAL streams boundaries. Further, new routing paths I and J are introduced and D direction is reversed. The old paths are not forgotten and when the voice calls are over, the network may revert back to a northbound gateway bias.

Algorithmically, a regional stream asserts a topology change request of the system to disengage from a default gateway bias and select a root node closest to all the nodes—a regional bias. The topology controller then evaluates (first in simulation and next in real world) the what-if scenarios of rerouting if nodes within the REGION boundaries are selected as HUB. Relay-5 is selected because it has the least disruption in routing paths and/or bridge latencies. Note that nodes have not changed in physical positions during these exercises. Only the routing has changed and it can rapidly switch to another predefined bias when requested.

This is a multi-tenant environment with multiple applications and diverse gateway/hub biases. Multiple hubs will be proposed. The most sought after (e.g. within the top three choices for all active tenant applications) is voted most-popular HUB candidate. This is an extension and re-use of the mobility SCAN agent, FIG. 10 with a different set of metrics.

SUMMARY

As disclosed, the system is concerned with several issues.

Convergence: There is increasing demand within the industrial enterprise, the smart home, car and cities to employ one wireless network to support both voice, video and data applications. The "voice" network, e.g. the telephone system, is often separate from the "data" network. Convergence is, as the name implies, the ability to converge these two networks into one network, servicing diverse performance (throughput, jitter, latency) requirements demanded by the applications running within one network, FIG. 22.

Rapid Re-Routing: The challenge lies in providing—within the same wireless network—the ability to address potentially conflicting latency and throughput needs of diverse applications. For example, voice needs to be transmitted with low delay (latency). Occasional voice packet loss is assumed. Conversely, data transmissions mandate delivery of all packets and while low latency is desirable it is not essential. Wireless network topologies should ideally be driven by the needs of application processes, see FIGS. 1-4. When not possible, switch over to another routing path ("topology") should be transparent to end user applications.

Self-Tuning: Large network deployments, operating over multiple radio protocols and hardware, require an device abstracted framework that incorporates machine learning to predict and avoid network bottlenecks by changing routing paths etc., before network bottlenecks occur. Learnt behaviors may first be validated in a simulation environment with representative test cases and then tested in the real world. Real world data is gathered and refines and evolves the simulation models—which in turn refine the rules or parameters settings for the network. These networks are disruption tolerant by design: Connectivity with "cloud" servers is intermittent at best. The framework must therefore support isolated networks, often mobile, that coalesce with other trusted networks to form larger "logical" networks see FIGS. 21-25.

The invention claimed is:

1. A system for managing communications in a mesh node for supporting variable networks comprising:
    processing a network packet in the mesh node having data from non-IP chirp devices wherein at least some of the non-IP chirp device communications are directly sent to recipients in communication with said node;
    modeling at least one simulation of network conditions in communications with said node;
    setting up forwarding rules and packet flow paths for each data packet and storing said rules in a rules database interfacing with physical connections within said mesh node; and wherein the simulation sets one or more network mesh node parameters used by the mesh node; wherein said one or more mesh node parameters are updated in light of changes to network topology.

2. The mesh node of claim 1 wherein said forwarding rules comprise a store of rules for network performance.

3. The mesh node of claim 1 further comprising a store of audit tools for network performance.

4. The mesh node of claim 1 further comprising an application management layer.

5. The mesh node of claim 1 wherein said at least one communication packet comprises a message that is time sensitive.

6. The mesh node of claim 5 wherein said time sensitive communication messages between publisher and subscribe messages.

7. The mesh node claim 1 wherein said simulation created by said mesh node determines the optimum layout for a tree-based network where said mesh node participates.

* * * * *